United States Patent
Picaud et al.

(10) Patent No.: US 12,515,077 B2
(45) Date of Patent: Jan. 6, 2026

(54) DEVICES AND METHODS BASED ON ULTRASOUNDS FOR RESTORING VISION OR ANY OTHER BRAIN FUNCTION

(71) Applicants: SORBONNE UNIVERSITE, Paris (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR); INSERM (INSTITUT NATIONAL DE LA SANTÉ ET DE LA RECHERCHE MÉDICALE), Paris (FR)

(72) Inventors: Serge Picaud, Paris (FR); Sara Cadoni, Paris (FR); José-Alain Sahel, Paris (FR); Mickaël Tanter, Paris (FR); Charlie Demene, Paris (FR)

(73) Assignees: SORBONNE UNIVERSITE, Paris (GR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR); INSERM (INSTITUT NATIONAL DE LA SANTÉ ET DE LA RECHERCHE MÉDICALE), Paris (FR)

( * ) Notice: Subject to any disclaimer, the term of this patent is extended or adjusted under 35 U.S.C. 154(b) by 118 days.

(21) Appl. No.: 18/044,645

(22) PCT Filed: Sep. 9, 2021

(86) PCT No.: PCT/EP2021/074868
§ 371 (c)(1),
(2) Date: Mar. 9, 2023

(87) PCT Pub. No.: WO2022/053587
PCT Pub. Date: Mar. 17, 2022

(65) Prior Publication Data
US 2023/0330440 A1    Oct. 19, 2023

(30) Foreign Application Priority Data

Sep. 9, 2020    (EP) .................................. 20306000

(51) Int. Cl.
*A61N 7/00*      (2006.01)
*C12N 15/86*     (2006.01)

(52) U.S. Cl.
CPC ............... *A61N 7/00* (2013.01); *C12N 15/86* (2013.01); *A61N 2007/0026* (2013.01); *A61N 2007/0095* (2013.01); *C12N 2750/14143* (2013.01)

(58) Field of Classification Search
CPC .............. A61N 7/00; A61N 2007/0026; A61N 2007/0095; A61N 2007/0021;
(Continued)

(56) References Cited

U.S. PATENT DOCUMENTS

| 2006/0167500 | A1* | 7/2006 | Towe ....................... A61N 1/32 607/46 |
| 2011/0178441 | A1* | 7/2011 | Tyler ...................... A61N 5/062 601/2 |

(Continued)

FOREIGN PATENT DOCUMENTS

WO    2013059833 A1    4/2013

OTHER PUBLICATIONS

Devereux et al., "A comprehensive set of sequence analysis programs for the VAX," Nucleic Acids Research, 1984, vol. 12, No. 1, IRL Press Limited, Owford, England, pp. 387-395.
(Continued)

*Primary Examiner* — Kaitlyn E Sebastian
(74) *Attorney, Agent, or Firm* — Birch, Stewart, Kolasch & Birch, LLP

(57) ABSTRACT

Devices and methods for reversibly stimulating neuronal cells in a subject. The devices include a module for generating ultrasounds at 4 MHz or more to stimulate neuronal cells expressing mechanosensitive channels with the ultrasounds. The methods include expressing mechanosensitive channels into neuronal cells and exposing the cells to (Continued)

ultrasounds at 4 MHz or more. Also, the use of the methods or devices for visual restoration in a subject.

5 Claims, 21 Drawing Sheets

Specification includes a Sequence Listing.

(58) Field of Classification Search
CPC .... A61N 2007/0073; A61N 2007/0078; C12N 15/86; C12N 2750/14143; A61K 48/0083; A61K 48/0058; A61K 48/0075; A61K 48/005; C07K 14/245
See application file for complete search history.

(56) References Cited

U.S. PATENT DOCUMENTS

| | | |
|---|---|---|
| 2013/0079621 A1 | 3/2013 | Shoham et al. |
| 2013/0245505 A1* | 9/2013 | Khuri-Yakub ............ A61F 9/08 601/2 |
| 2014/0249454 A1 | 9/2014 | Carpentier et al. |
| 2016/0220672 A1* | 8/2016 | Chalasani ............ C07K 14/705 |
| 2019/0217129 A1 | 7/2019 | Ellingwood et al. |
| 2019/0308035 A1* | 10/2019 | Sun ..................... G01N 33/5058 |
| 2019/0321473 A1* | 10/2019 | Towne ..................... A61N 7/00 |
| 2021/0212709 A1* | 7/2021 | Pernot ................. A61B 8/5269 |
| 2021/0346725 A1* | 11/2021 | Rousso ................. A61B 8/085 |

OTHER PUBLICATIONS

Khabou et al., "Insight into the mechanisms of enhanced retinal transduction by the engineered AAV2 capsid variant-7m8," Biotechnology and Bioengineering, 2016; vol. 113, No. 12, Wiley Periodicals Inc., pp. 2712-2724.

Soloperto et al., "Mechano-sensitization of mammalian neuronal networks through expression of the bacterial mechanosensitive MscL channel," Journal of Cell Science, 2018, 131, jcs210393, 17 pages.

International Search Report mailed on Jan. 25, 2022, in corresponding International Application No. PCT/EP2021/074868, 6 pages.

* cited by examiner

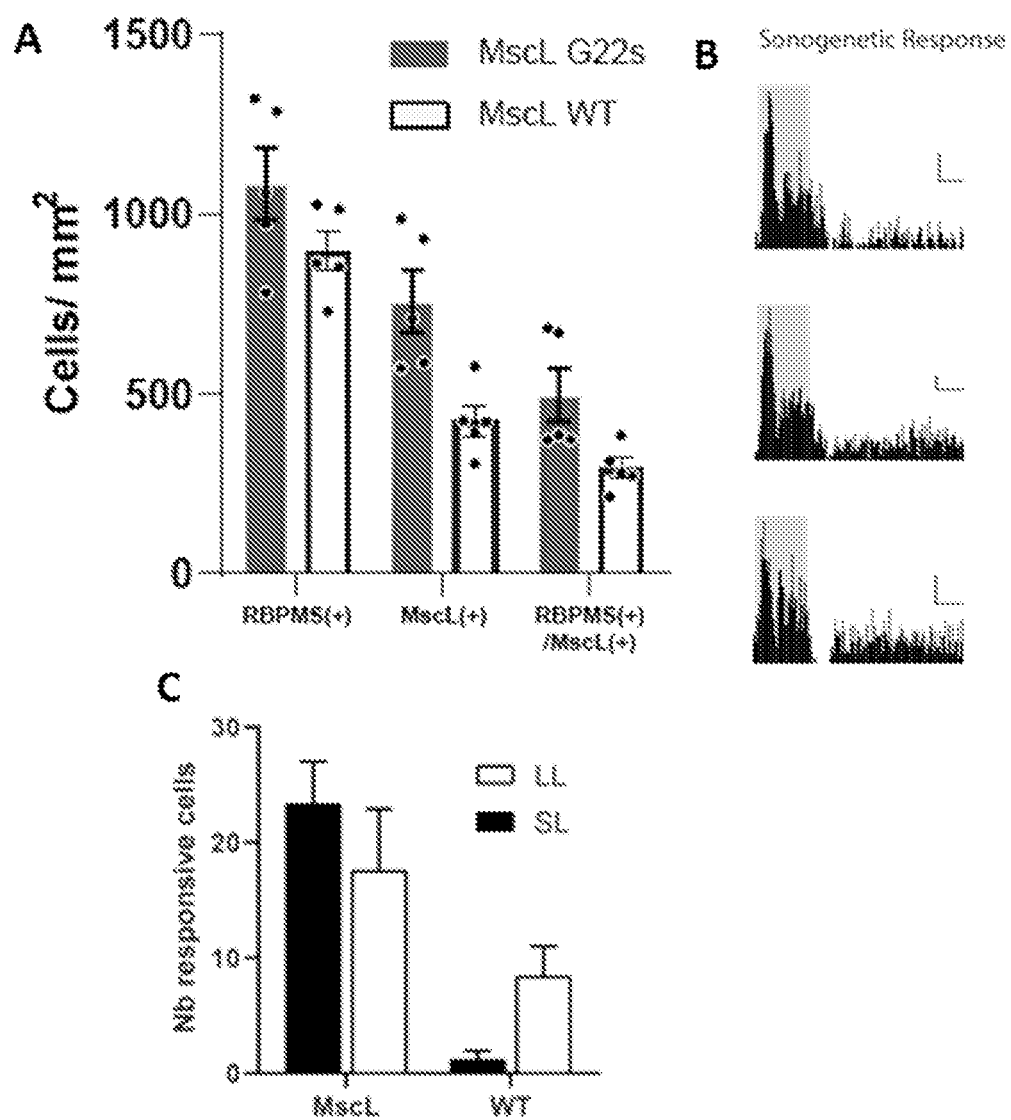
FIG. 1 (A-C)

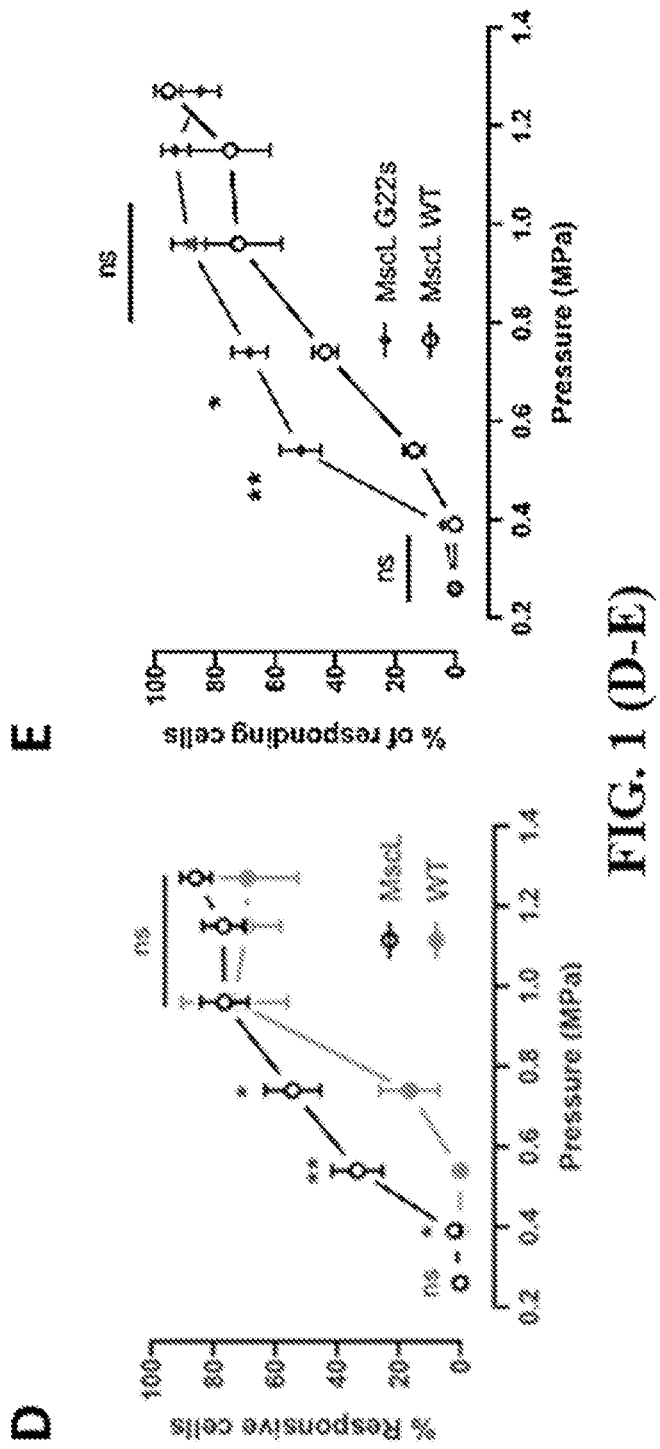
FIG. 1 (D-E)

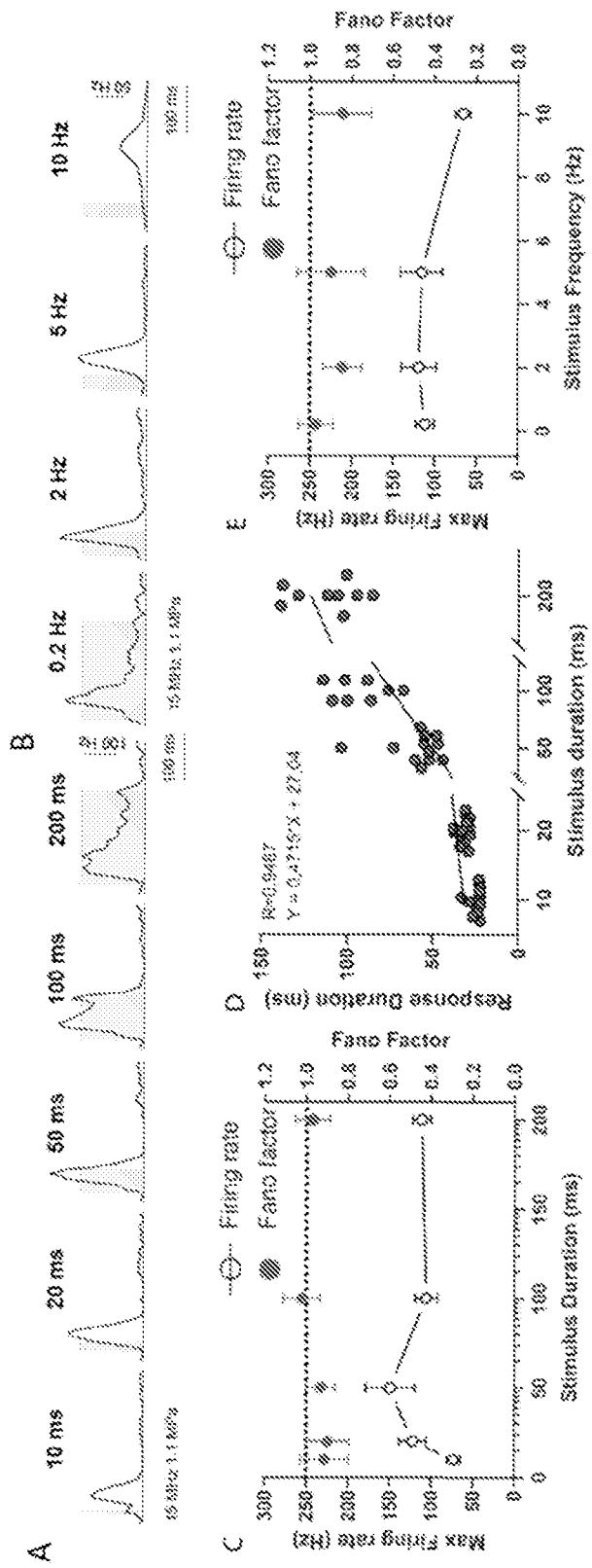
FIG. 2 (A-E)

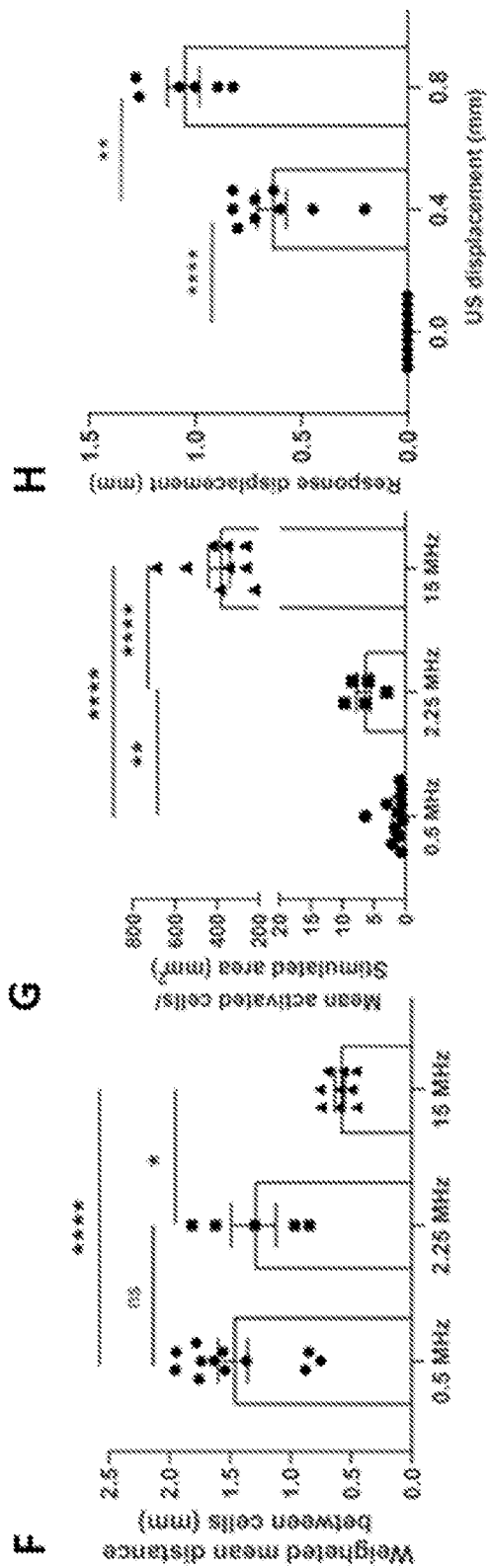
FIG. 2 (F-H)

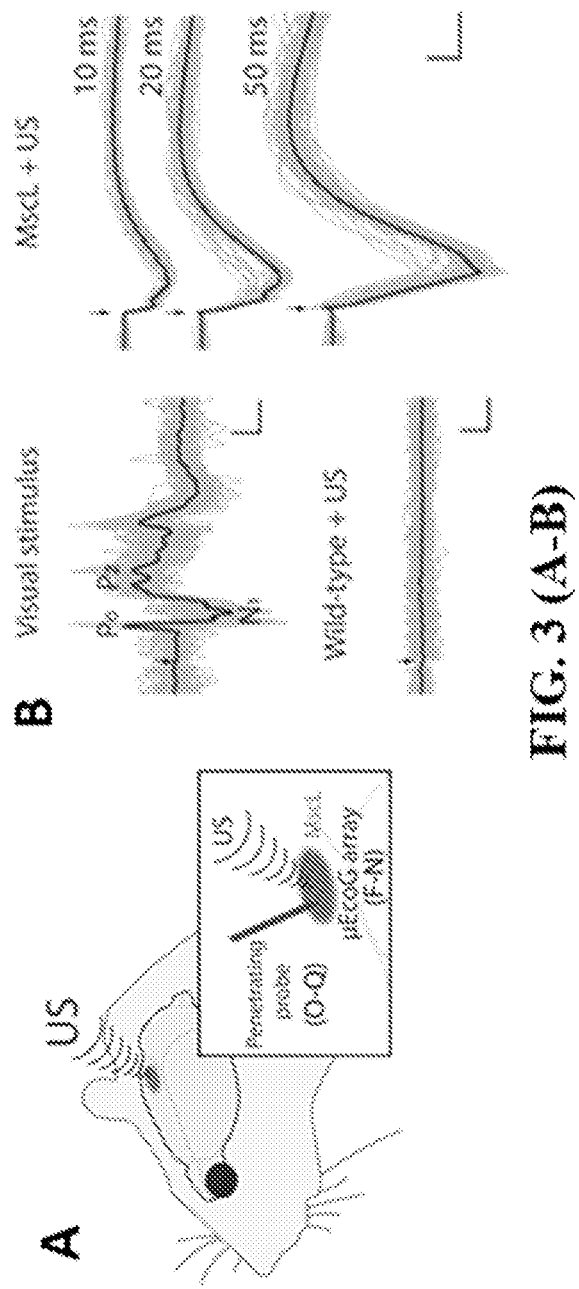
FIG. 3 (A-B)

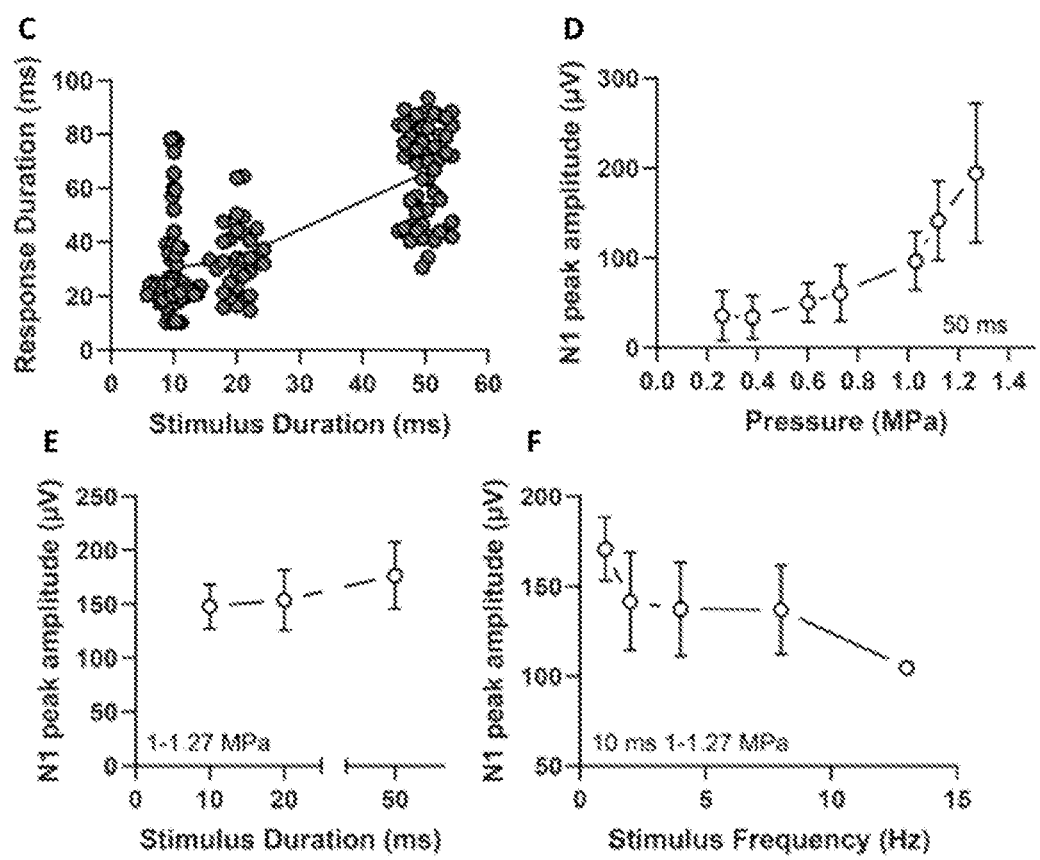
FIG. 3 (C-F)

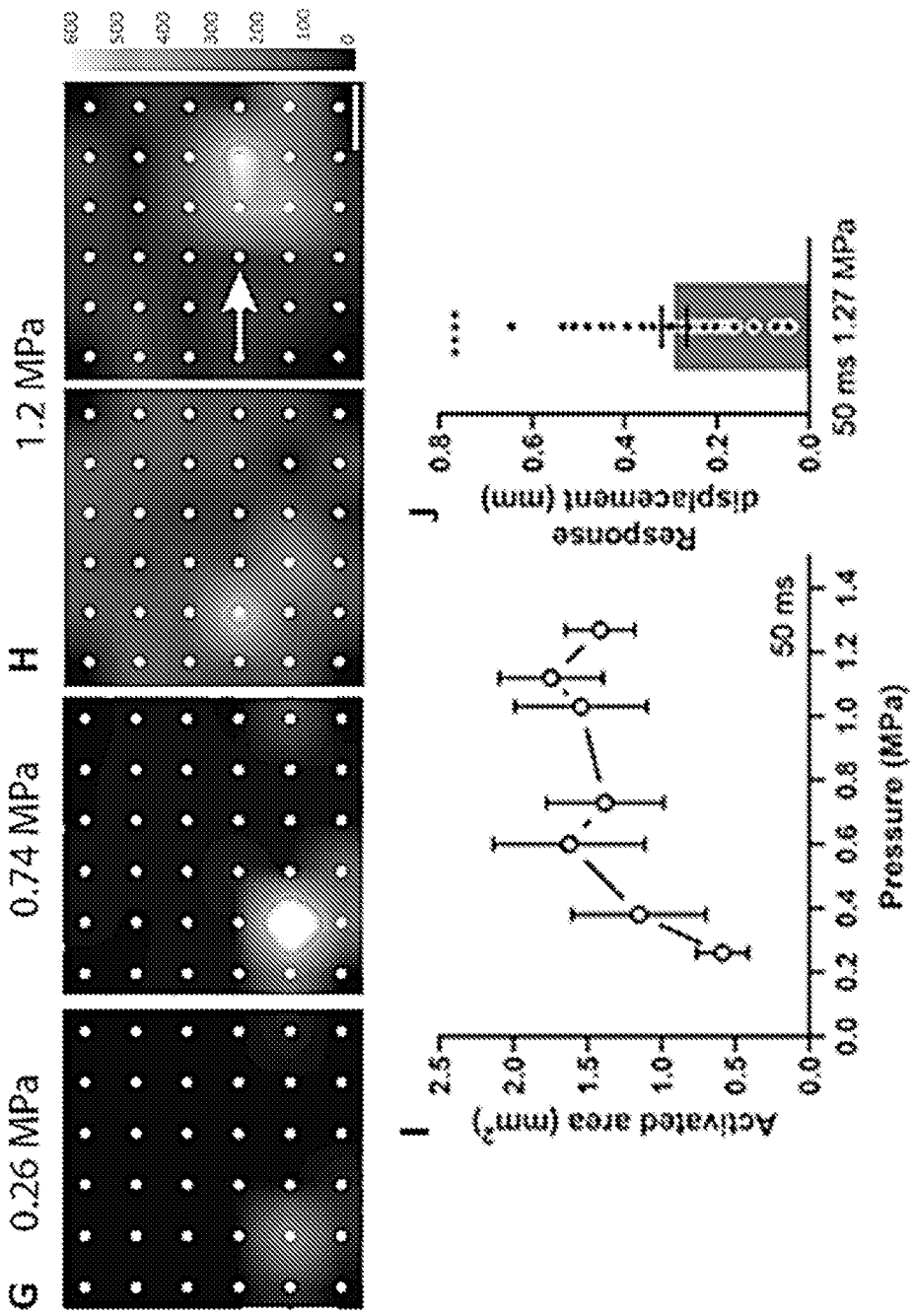
FIG. 3 (G-J)

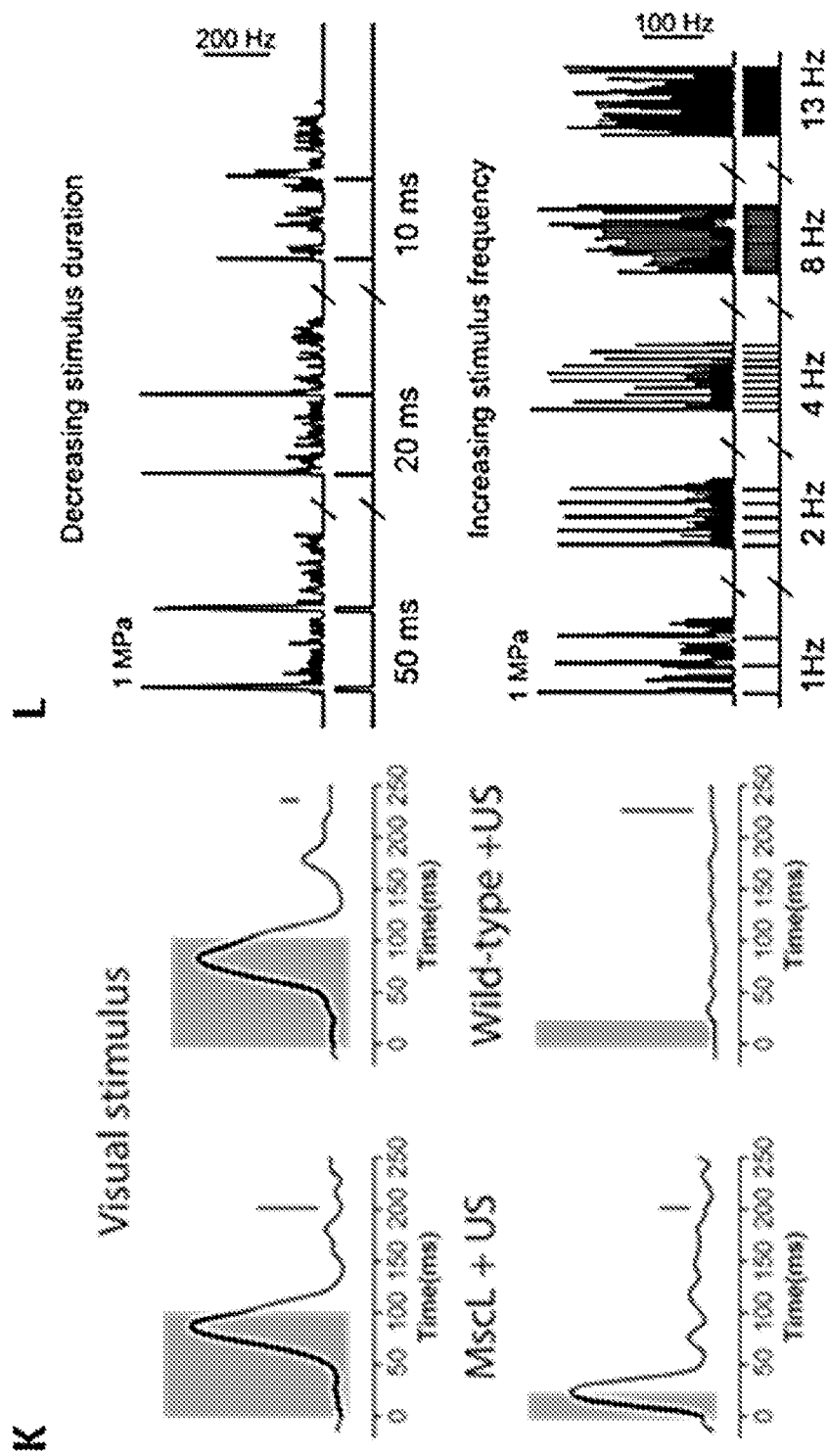
FIG. 3 (K-L)

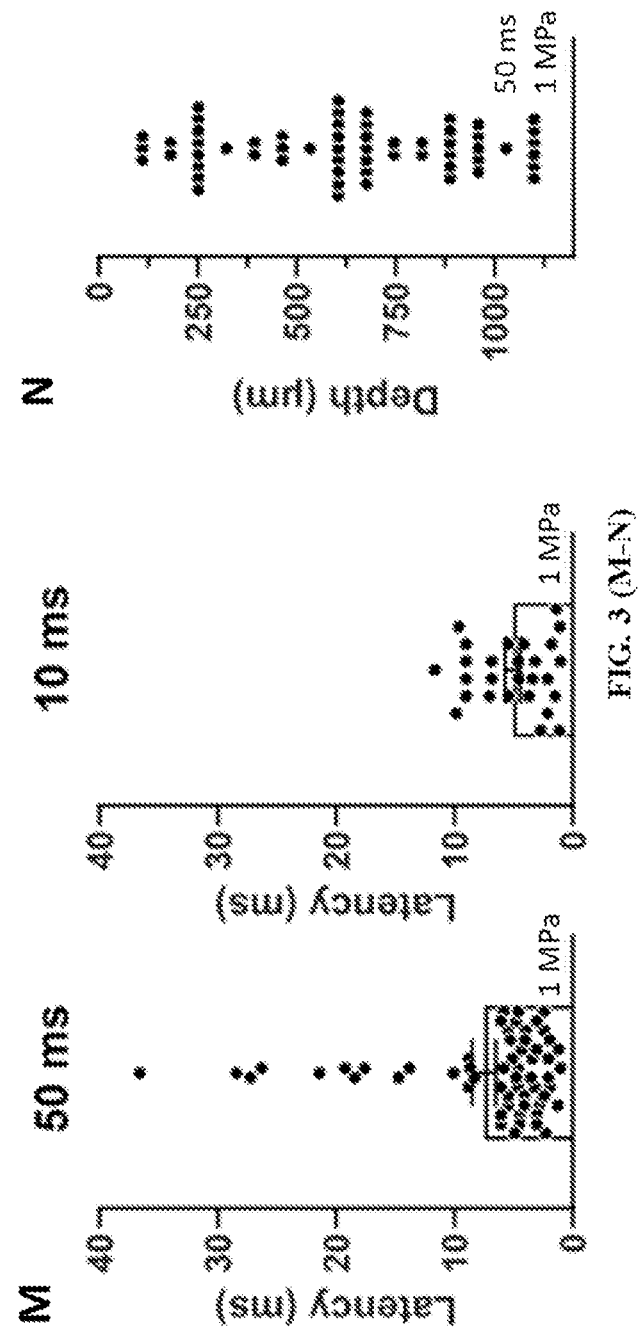
FIG. 3 (M-N)

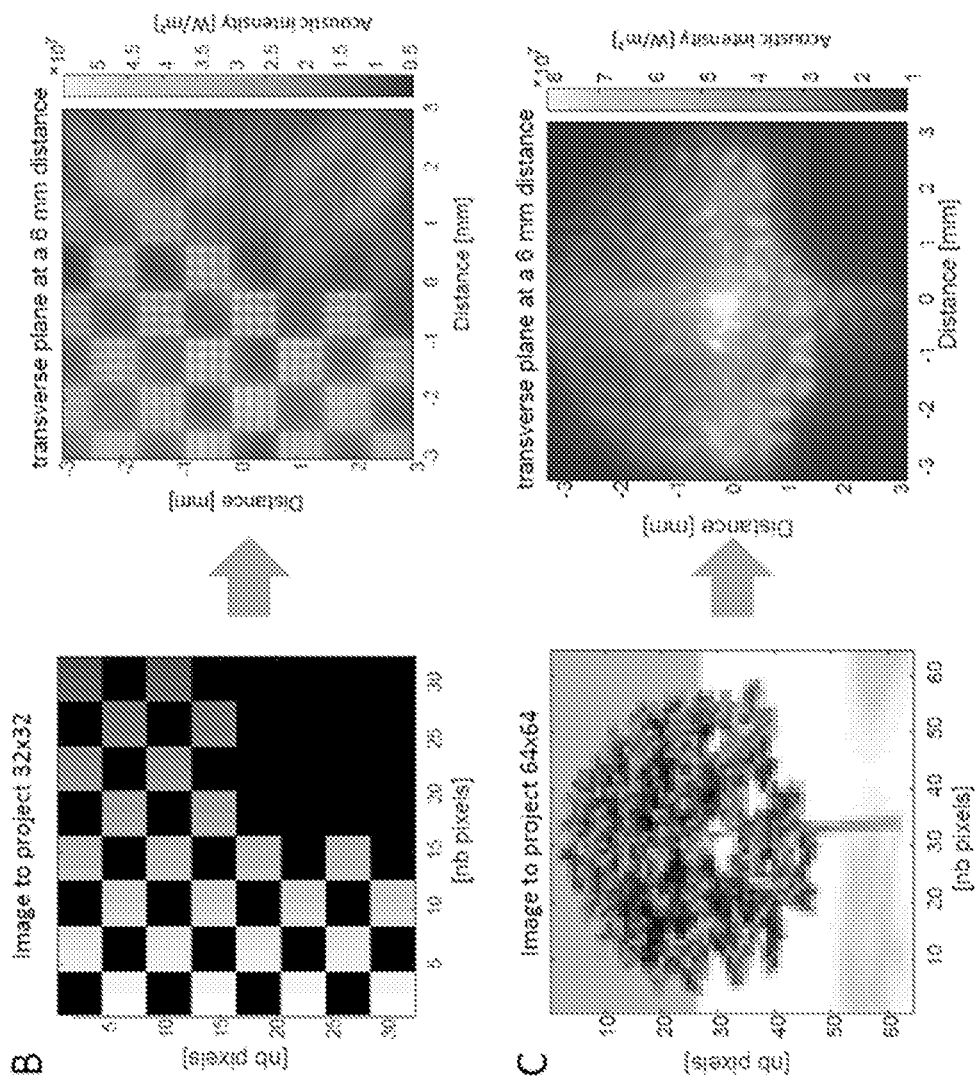
FIG. 8 (B-C)

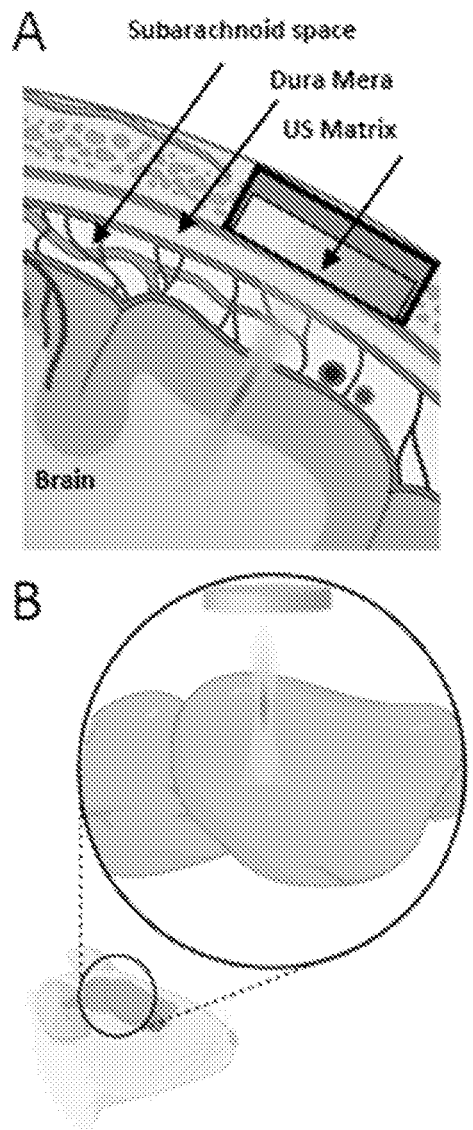
FIG. 10 (A-B)

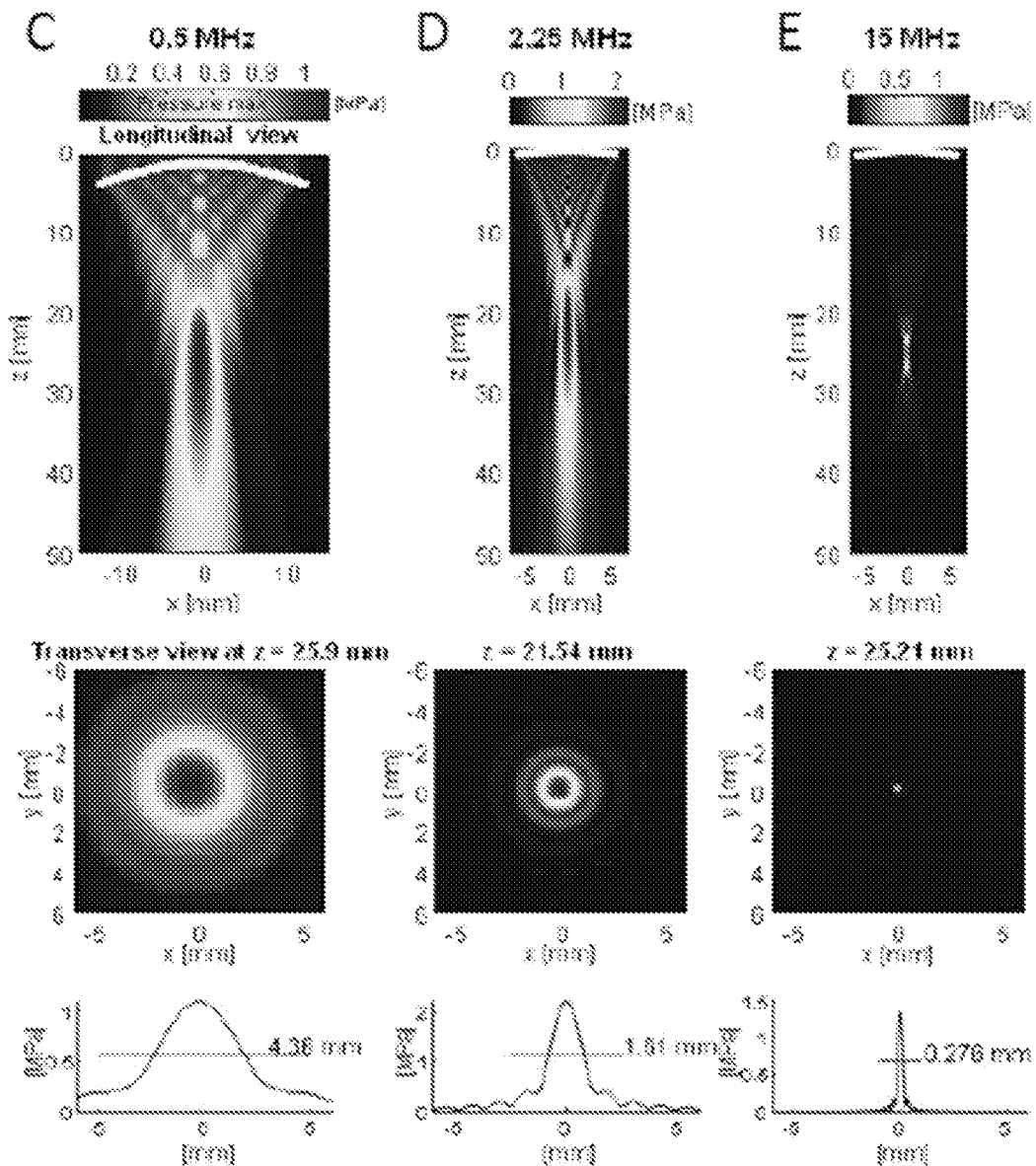
FIG. 10 (C-E)

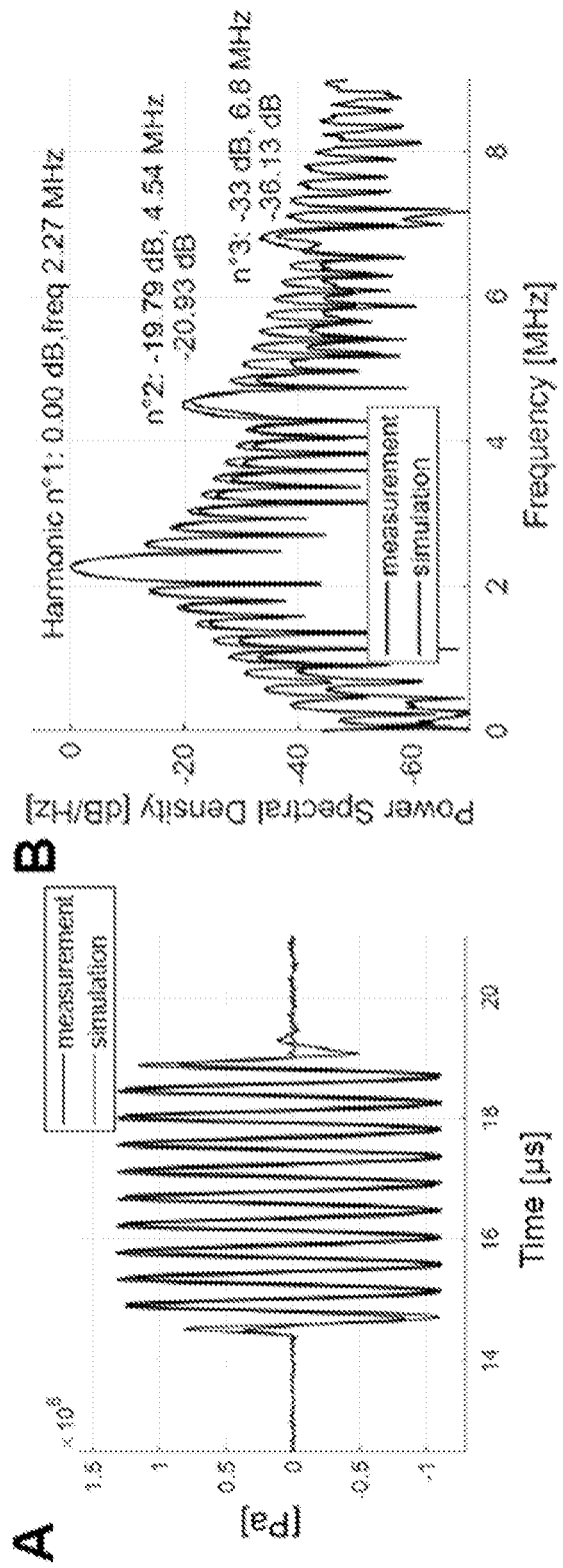
FIG. 11 (A-B)

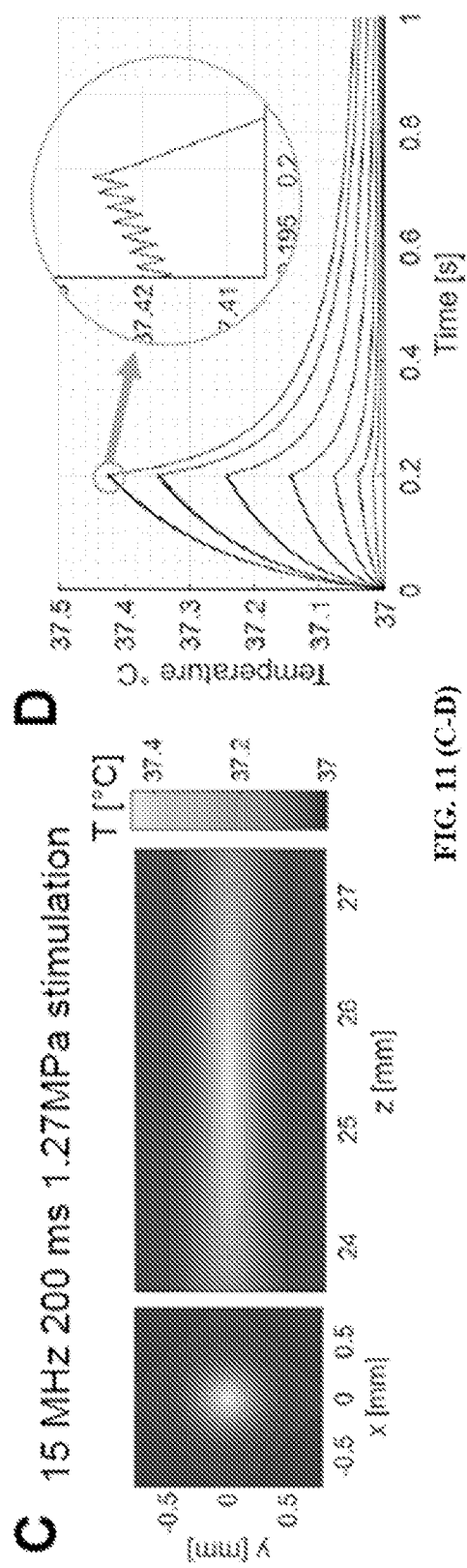
FIG. 11 (C-D)

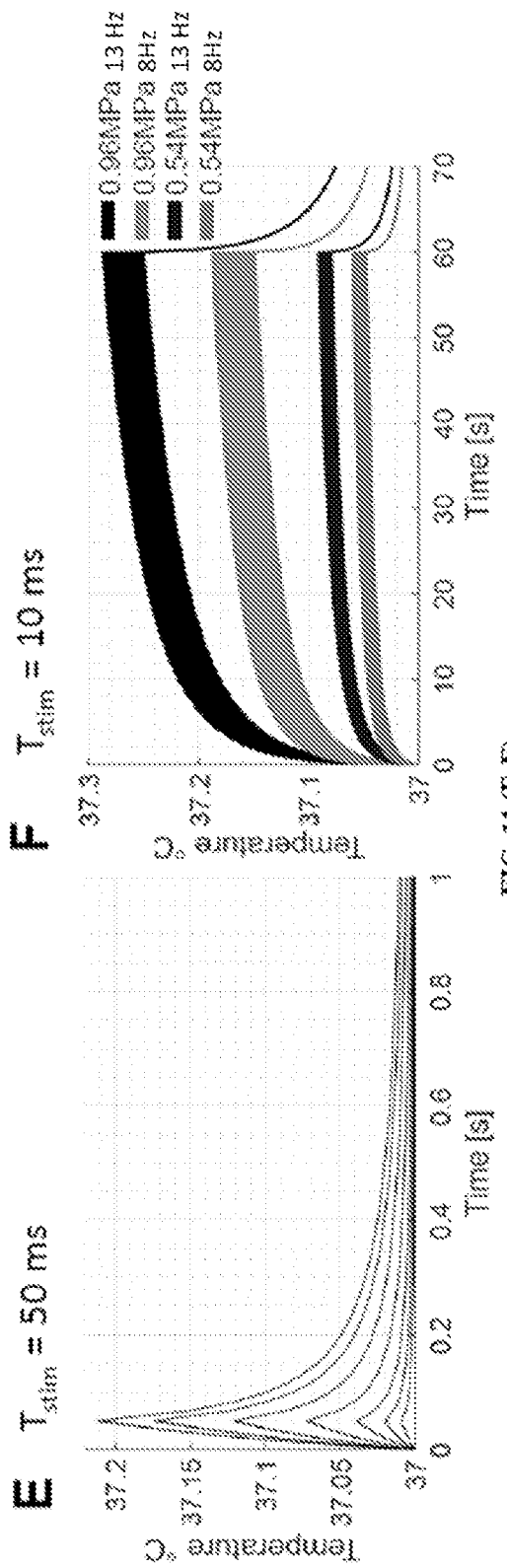
FIG. 11 (E-F)

SEQUENCE LISTING

<160> NUMBER OF SEQ ID NOS: 3

<210> SEQ ID NO 1
<211> LENGTH: 142
<212> TYPE: PRT
<213> ORGANISM: Escherichia coli
<220> FEATURE:
<223> OTHER INFORMATION: MscL WT

<400> SEQUENCE: 1

Met Ala Ser Ile Ile Lys Glu Phe Arg Glu Phe Ala Met Arg Gly Asn
1               5                   10                  15

Val Val Asp Leu Ala Val Gly Val Ile Ile Gly Ala Ala Phe Gly Lys
                20                  25                  30

Ile Val Ser Ser Leu Val Ala Asp Ile Ile Met Pro Pro Leu Gly Leu
            35                  40                  45

Leu Ile Gly Gly Ile Asp Phe Lys Gln Phe Ala Val Thr Leu Arg Asp
    50                  55                  60

Ala Gln Gly Asp Ile Pro Ala Val Val Met His Tyr Gly Val Phe Ile
65                  70                  75                  80

Gln Asn Val Phe Asp Phe Leu Ile Val Ala Phe Ala Ile Phe Met Ala
                85                  90                  95

Ile Lys Leu Ile Asn Lys Leu Asn Arg Lys Lys Glu Glu Pro Ala Ala
            100                 105                 110

Ala Pro Ala Pro Thr Lys Glu Glu Val Leu Leu Thr Glu Ile Arg Asp
        115                 120                 125

Leu Leu Lys Glu Gln Asn Asn Arg Ser Ala Ser Leu Val Pro
    130                 135                 140

<210> SEQ ID NO 2
<211> LENGTH: 142
<212> TYPE: PRT
<213> ORGANISM: Artificial Sequence
<220> FEATURE:
<223> OTHER INFORMATION: MscL G22s

<400> SEQUENCE: 2

Met Ala Ser Ile Ile Lys Glu Phe Arg Glu Phe Ala Met Arg Gly Asn
1               5                   10                  15

Val Val Asp Leu Ala Val Ser Val Ile Ile Gly Ala Ala Phe Gly Lys
                20                  25                  30

Ile Val Ser Ser Leu Val Ala Asp Ile Ile Met Pro Pro Leu Gly Leu
            35                  40                  45

Leu Ile Gly Gly Ile Asp Phe Lys Gln Phe Ala Val Thr Leu Arg Asp
    50                  55                  60

Ala Gln Gly Asp Ile Pro Ala Val Val Met His Tyr Gly Val Phe Ile
65                  70                  75                  80

Gln Asn Val Phe Asp Phe Leu Ile Val Ala Phe Ala Ile Phe Met Ala
                85                  90                  95

Ile Lys Leu Ile Asn Lys Leu Asn Arg Lys Lys Glu Glu Pro Ala Ala
            100                 105                 110

Ala Pro Ala Pro Thr Lys Glu Glu Val Leu Leu Thr Glu Ile Arg Asp
        115                 120                 125

Leu Leu Lys Glu Gln Asn Asn Arg Ser Ala Ser Leu Val Pro
    130                 135                 140

<210> SEQ ID NO 3
<211> LENGTH: 476

```
<212> TYPE: PRT
<213> ORGANISM: Artificial Sequence
<220> FEATURE:
<223> OTHER INFORMATION: tdTomato

<400> SEQUENCE: 3
```

| | | | | | | | | | | | | | | |
|---|---|---|---|---|---|---|---|---|---|---|---|---|---|---|
| Met | Val | Ser | Lys | Gly | Glu | Glu | Val | Ile | Lys | Glu | Phe | Met | Arg | Phe | Lys |
| 1 | | | | 5 | | | | | 10 | | | | | 15 | |

| | | | | | | | | | | | | | | |
|---|---|---|---|---|---|---|---|---|---|---|---|---|---|---|
| Val | Arg | Met | Glu | Gly | Ser | Met | Asn | Gly | His | Glu | Phe | Glu | Ile | Glu | Gly |
| | | | 20 | | | | | 25 | | | | | 30 | | |

| | | | | | | | | | | | | | | |
|---|---|---|---|---|---|---|---|---|---|---|---|---|---|---|
| Glu | Gly | Glu | Gly | Arg | Pro | Tyr | Glu | Gly | Thr | Gln | Thr | Ala | Lys | Leu | Lys |
| | | | 35 | | | | | 40 | | | | | 45 | | |

| | | | | | | | | | | | | | | |
|---|---|---|---|---|---|---|---|---|---|---|---|---|---|---|
| Val | Thr | Lys | Gly | Gly | Pro | Leu | Pro | Phe | Ala | Trp | Asp | Ile | Leu | Ser | Pro |
| 50 | | | | | 55 | | | | | 60 | | | | | |

| | | | | | | | | | | | | | | |
|---|---|---|---|---|---|---|---|---|---|---|---|---|---|---|
| Gln | Phe | Met | Tyr | Gly | Ser | Lys | Ala | Tyr | Val | Lys | His | Pro | Ala | Asp | Ile |
| 65 | | | | | 70 | | | | | 75 | | | | | 80 |

| | | | | | | | | | | | | | | |
|---|---|---|---|---|---|---|---|---|---|---|---|---|---|---|
| Pro | Asp | Tyr | Lys | Lys | Leu | Ser | Phe | Pro | Glu | Gly | Phe | Lys | Trp | Glu | Arg |
| | | | | 85 | | | | | 90 | | | | | 95 | |

| | | | | | | | | | | | | | | |
|---|---|---|---|---|---|---|---|---|---|---|---|---|---|---|
| Val | Met | Asn | Phe | Glu | Asp | Gly | Gly | Leu | Val | Thr | Val | Thr | Gln | Asp | Ser |
| | | | 100 | | | | | 105 | | | | | 110 | | |

| | | | | | | | | | | | | | | |
|---|---|---|---|---|---|---|---|---|---|---|---|---|---|---|
| Ser | Leu | Gln | Asp | Gly | Thr | Leu | Ile | Tyr | Lys | Val | Lys | Met | Arg | Gly | Thr |
| | | | 115 | | | | | 120 | | | | | 125 | | |

| | | | | | | | | | | | | | | |
|---|---|---|---|---|---|---|---|---|---|---|---|---|---|---|
| Asn | Phe | Pro | Pro | Asp | Gly | Pro | Val | Met | Gln | Lys | Lys | Thr | Met | Gly | Trp |
| 130 | | | | | 135 | | | | | 140 | | | | | |

| | | | | | | | | | | | | | | |
|---|---|---|---|---|---|---|---|---|---|---|---|---|---|---|
| Glu | Ala | Ser | Thr | Glu | Arg | Leu | Tyr | Pro | Arg | Asp | Gly | Val | Leu | Lys | Gly |
| 145 | | | | | 150 | | | | | 155 | | | | | 160 |

| | | | | | | | | | | | | | | |
|---|---|---|---|---|---|---|---|---|---|---|---|---|---|---|
| Glu | Ile | His | Gln | Ala | Leu | Lys | Leu | Lys | Asp | Gly | Gly | Arg | Tyr | Leu | Val |
| | | | | 165 | | | | | 170 | | | | | 175 | |

| | | | | | | | | | | | | | | |
|---|---|---|---|---|---|---|---|---|---|---|---|---|---|---|
| Glu | Phe | Lys | Thr | Ile | Tyr | Met | Ala | Lys | Lys | Pro | Val | Gln | Leu | Pro | Gly |
| | | | 180 | | | | | 185 | | | | | 190 | | |

| | | | | | | | | | | | | | | |
|---|---|---|---|---|---|---|---|---|---|---|---|---|---|---|
| Tyr | Tyr | Tyr | Val | Asp | Thr | Lys | Leu | Asp | Ile | Thr | Ser | His | Asn | Glu | Asp |
| | | | 195 | | | | | 200 | | | | | 205 | | |

| | | | | | | | | | | | | | | |
|---|---|---|---|---|---|---|---|---|---|---|---|---|---|---|
| Tyr | Thr | Ile | Val | Glu | Gln | Tyr | Glu | Arg | Ser | Glu | Gly | Arg | His | His | Leu |
| | 210 | | | | | 215 | | | | | 220 | | | | |

| | | | | | | | | | | | | | | |
|---|---|---|---|---|---|---|---|---|---|---|---|---|---|---|
| Phe | Leu | Gly | His | Gly | Thr | Gly | Ser | Thr | Gly | Ser | Gly | Ser | Ser | Gly | Thr |
| 225 | | | | | 230 | | | | | 235 | | | | | 240 |

| | | | | | | | | | | | | | | |
|---|---|---|---|---|---|---|---|---|---|---|---|---|---|---|
| Ala | Ser | Ser | Glu | Asp | Asn | Asn | Met | Ala | Val | Ile | Lys | Glu | Phe | Met | Arg |
| | | | | 245 | | | | | 250 | | | | | 255 | |

| | | | | | | | | | | | | | | |
|---|---|---|---|---|---|---|---|---|---|---|---|---|---|---|
| Phe | Lys | Val | Arg | Met | Glu | Gly | Ser | Met | Asn | Gly | His | Glu | Phe | Glu | Ile |
| | | | 260 | | | | | 265 | | | | | 270 | | |

| | | | | | | | | | | | | | | |
|---|---|---|---|---|---|---|---|---|---|---|---|---|---|---|
| Glu | Gly | Glu | Gly | Glu | Gly | Arg | Pro | Tyr | Glu | Gly | Thr | Gln | Thr | Ala | Lys |
| | | | 275 | | | | | 280 | | | | | 285 | | |

| | | | | | | | | | | | | | | |
|---|---|---|---|---|---|---|---|---|---|---|---|---|---|---|
| Leu | Lys | Val | Thr | Lys | Gly | Gly | Pro | Leu | Pro | Phe | Ala | Trp | Asp | Ile | Leu |
| | 290 | | | | | 295 | | | | | 300 | | | | |

| | | | | | | | | | | | | | | |
|---|---|---|---|---|---|---|---|---|---|---|---|---|---|---|
| Ser | Pro | Gln | Phe | Met | Tyr | Gly | Ser | Lys | Ala | Tyr | Val | Lys | His | Pro | Ala |
| 305 | | | | | 310 | | | | | 315 | | | | | 320 |

| | | | | | | | | | | | | | | |
|---|---|---|---|---|---|---|---|---|---|---|---|---|---|---|
| Asp | Ile | Pro | Asp | Tyr | Lys | Lys | Leu | Ser | Phe | Pro | Glu | Gly | Phe | Lys | Trp |
| | | | | 325 | | | | | 330 | | | | | 335 | |

| | | | | | | | | | | | | | | |
|---|---|---|---|---|---|---|---|---|---|---|---|---|---|---|
| Glu | Arg | Val | Met | Asn | Phe | Glu | Asp | Gly | Gly | Leu | Val | Thr | Val | Thr | Gln |
| | | | 340 | | | | | 345 | | | | | 350 | | |

| | | | | | | | | | | | | | | |
|---|---|---|---|---|---|---|---|---|---|---|---|---|---|---|
| Asp | Ser | Ser | Leu | Gln | Asp | Gly | Thr | Leu | Ile | Tyr | Lys | Val | Lys | Met | Arg |
| | | 355 | | | | | 360 | | | | | 365 | | | |

| | | | | | | | | | | | | |
|---|---|---|---|---|---|---|---|---|---|---|---|---|
| Gly | Thr | Asn | Phe | Pro | Pro | Asp | Gly | Pro | Val | Met | Gln | Lys | Lys | Thr | Met |
| | 370 | | | | | 375 | | | | | 380 | | | | |

-continued

| | | | | | | | | | | | | | | |
|---|---|---|---|---|---|---|---|---|---|---|---|---|---|---|
| Gly 385 | Trp | Glu | Ala | Ser | Thr 390 | Glu | Arg | Leu | Tyr | Pro 395 | Arg | Asp | Gly | Val | Leu 400 |
| Lys | Gly | Glu | Ile | His 405 | Gln | Ala | Leu | Lys | Leu 410 | Lys | Asp | Gly | Gly | His 415 | Tyr |
| Leu | Val | Glu | Phe 420 | Lys | Thr | Ile | Tyr | Met 425 | Ala | Lys | Lys | Pro | Val 430 | Gln | Leu |
| Pro | Gly | Tyr 435 | Tyr | Tyr | Val | Asp | Thr 440 | Lys | Leu | Asp | Ile | Thr 445 | Ser | His | Asn |
| Glu | Asp 450 | Tyr | Thr | Ile | Val | Glu 455 | Gln | Tyr | Glu | Arg | Ser 460 | Glu | Gly | Arg | His |
| His 465 | Leu | Phe | Leu | Tyr | Gly 470 | Met | Asp | Glu | Leu | Tyr 475 | Lys | | | | |

DEVICES AND METHODS BASED ON ULTRASOUNDS FOR RESTORING VISION OR ANY OTHER BRAIN FUNCTION

FIELD

The present invention relates to devices and methods for stimulating specific neuronal cells using ultrasounds. In particular, the present invention relates to the use of said devices or methods for visual restoration in a subject.

BACKGROUND

Neuromodulation can be defined as the process of stimulating neuronal activity in the central, peripheral or autonomic nervous system. Neuromodulation has a wide range of potential applications: development of neural prosthetics to replace impaired neuronal function, of new forms of therapy, and of new research tools for investigating neurons and neuronal function. In particular, the development of non-invasive cortical and subcortical neuron stimulation is of interest for a wide range of neurological diseases and sensory handicaps such as vision loss. Thereby, various approaches have been tested to restore vision, but have encountered several limitations limiting their efficacy.

Cortical surface electrodes providing form vision are limited by their large size (0.5 mm) and their wide spacing 2-4 mm$^2$. Their long-term use is also poised by the reported loss of efficacy overtime. Optogenetic therapy has provided an alternative to stimulate neurons at distance with a potential higher resolution as demonstrated on the retina. However, for brain applications, optical stimulations are hindered by the dura mater and by tissue diffraction and absorption. Ultrasound (US) waves overcome these limitations of optical waves for stimulating non-invasively cortical and sub-cortical brains area.

To date, several methods and devices using ultrasound stimulation were described in the art.

The patent application WO2013/059833 discloses a method and a system for modulating the activity of the brain, wherein an acoustic signal is directed transcranially to a target region in the brain. Said acoustic signal has a frequency ranging between 100 kHz and 10 MHz.

The patent application US2013/0245505 discloses a retinal stimulation and prosthetic device emitting a focused ultrasonic signal, wherein the acoustic frequency ranges from 20 MHz to 100 MHz.

The patent application US2014/0249454 discloses a device and a method for treating the sensory capacity of a person, such as deafness, using emitted ultrasound waves into the brain, whose frequency ranges between 200 kHz and 10 MHz.

The patent application US2013/0079621 discloses a method and a system of operating an acoustic wave source and more particularly to the use of acoustic energy of an acoustic wave source for diagnosis, stimulation and/or inhibition. Said acoustic wave has a frequency ranges between 1 and 20 MHz.

However, the use of low frequency stimulation results in poor spatial resolution and long-lasting response, incompatible with some applications such as vision restoration, whereas the use of high frequency stimulation results in high acoustic energy deposit with a risk of thermal heating and ultrasound-mediated tissue damage.

Therefore, there is a need to develop new safe and efficient methods to stimulate cortical and subcortical areas, and in particular to develop safe and efficient methods to restore vision in subjects.

Combinations of ultrasound stimulation with exogenous expression of mechanosensitive channels in neurons were also described in the patent applications US2019/0217129 and US2019/0308035. However, these methods use low frequency stimulation (i.e. 20-1000 kHz and 500 kHz respectively), and thus suffer from the same limitation as described hereinabove (i.e. low spatial resolution incompatible with vision restoration for example).

Here, the Inventors developed a sonogenetic approach compatible with vision restoration based on the sensitization of neurons with the bacterial mechanosensitive ion channel of large conductance (MscL) combined with a high frequency stimulation. Indeed, the Inventors demonstrated that the stimulation of cortical and retinal neurons expressing MscL with 15 MHz ultrasound stimuli induced a high spatio-temporal activation of neurons ex vivo and in vivo, compatible with vision restoration requiring videorate stimulation.

SUMMARY

The present invention first relates to an ultrasound system configured to receive electrical signals as input for reversibly stimulating neuronal cells expressing mechanosensitive channels in a subject,
  wherein said ultrasound system comprises a module (A) comprising an ultrasound array comprising at least one ultrasonic element, for emitting at least one ultrasound stimulus ranging from about 4 MHz to about 20 MHz central frequency, preferably at least one ultrasound stimulus of about 15 MHz central frequency, wherein said at least one ultrasound stimulus is unfocused.

In one embodiment, the at least one ultrasound stimulus has a peak acoustic pressure comprised between about 0.01 and about 2 MPa and a sonication duration comprised between about 0.1 and about 200 ms, and is repeated with an inter-stimulus interval (ISI) between about 0.001 and about 10 s, preferably said at least one ultrasound stimulus is a burst of ultrasound signals.

In one embodiment, the at least one ultrasound stimulus is a multi-frequential ultrasound stimulus.

In one embodiment, the at least one ultrasound stimulus is simultaneously focused at multiple locations, the at least one ultrasound stimulus is composed of several ultrasonic beams successively focused at different locations within the whole duration of the ultrasound stimulus or the at least one ultrasound stimulus is a complex structured spatial and temporal ultrasound pattern.

In one embodiment, the at least one ultrasonic element is an ultrasound stimulus transducer with a central frequency ranging from about 4 MHz to about 20 MHz central frequency, preferably of about 15 MHz central frequency.

In one embodiment, the neuronal cells or extensions thereof are located in cortical areas including visual cortex, prefrontal cortex, sensory cortex, motor cortex, auditory cortex, Broca's area, Wernicke's area and association areas; or in subcortical areas including basal ganglia, thalamus, hypothalamus, brainstem, hippocampus, amygdala; or in the spinal cord, or the neuronal cells are located in the retina, in the vestibule or in the cochlea. In one embodiment, the neuronal cells are cortical neurons of the visual cortex, neurons of the lateral geniculate nucleus, or retinal ganglion cells.

In one embodiment, said system is for inducing vision of an image in the subject, preferably said subject has impaired visual functions, more preferably said impaired visual functions result from diabetic retinopathy, optic neuropathies, glaucoma or trauma.

In one embodiment, the system further comprises:
an acquisition module (B) to acquire an image or a visual information, and
a processing module (C) configured to translate said image or visual information into electrical signals as output, that are transmitted to the module (A) for emitting complex structured spatial and temporal ultrasound patterns.

In one embodiment, the mechanosensitive channels are selected from the group comprising or consisting of Piezo channels, MscLs (large-conductance mechanosensitive channels) and CFTR (cystic fibrosis transmembrane conductance regulator) channels, preferably the mechanosensitive channels are MscLs, more preferably MscL-G22s, and optionally the mechanosensitive channels are fused to a reporter protein, preferably a cytoplasmic soluble protein, more preferably to tdTomato protein.

The present invention also relates to the use of at least one ultrasound stimulus for inducing vision of an image in a subject,
wherein said subject comprises neuronal cells expressing mechanosensitive channels,
wherein said ultrasound stimulus is ranging from about 4 MHz to about 20 MHz central frequency, preferably of about 15 MHz central frequency, and
wherein said neuronal cells are cortical neurons of the visual cortex, neurons of the lateral geniculate nucleus, or retinal ganglion cells.

In one embodiment, the subject presents impaired visual functions, preferably resulting from diabetic retinopathy, optic neuropathies, glaucoma or trauma.

In one embodiment, the at least one ultrasound stimulus has a peak acoustic pressure comprised between about 0.01 and about 2 MPa and a sonication duration comprised between about 0.1 and about 200 ms, and is repeated with an inter-stimulus interval (ISI) between about 0.001 and about 10 s, preferably said at least one ultrasound stimulus is a burst of ultrasound signals.

In one embodiment, the at least one ultrasound stimulus is a multi-frequential ultrasound stimulus and/or said at least one ultrasound stimulus is unfocused, preferably the at least one ultrasound stimulus is simultaneously focused at multiple locations, is composed of several ultrasonic beams successively focused at different locations within the whole duration of the ultrasound stimulus or is a complex structured spatial and temporal ultrasound pattern.

In one embodiment, the mechanosensitive channels are selected from the group comprising or consisting of Piezo channels, MscLs (large-conductance mechanosensitive channels) and CFTR (cystic fibrosis transmembrane conductance regulator) channels, preferably the mechanosensitive channels are MscLs, more preferably MscL-G22s, and optionally the mechanosensitive channels are fused to a reporter protein, preferably a cytoplasmic soluble protein, more preferably to tdTomato protein.

The present invention further relates to a vector comprising a nucleic acid sequence encoding a mechanosensitive channel for use in transducing neuronal cells of the subject, thereby restoring a sensory deficit in a subject in need thereof, wherein the subject is to be further exposed to or treated with at least one ultrasound stimulus ranging from about 4 MHz to about 20 MHz central frequency.

The present invention further relates to a method for reversibly stimulating neuronal cells in a subject, wherein said method comprises:
(i) expressing exogenous mechanosensitive channels in the neuronal cells and,
(ii) exposing the neuronal cells expressing exogenous mechanosensitive channels to at least one ultrasound stimulus ranging from about 4 MHz to about 20 MHz central frequency, preferably at least one ultrasound stimulus of about 15 MHz central frequency.

In one embodiment, step (i) comprises a step of transducing neuronal cells with a vector comprising a nucleic acid sequence encoding a mechanosensitive channel, thereby inducing expression of exogenous mechanosensitive channels by the neuronal cells.

In one embodiment, the at least one ultrasound stimulus has a peak acoustic pressure comprised between about 0.01 and about 2 MPa and a sonication duration (SD) between about 0.1 and about 200 ms, and is repeated with an inter-stimulus interval (ISI) between about 0.001 and about 10s.

In one embodiment, the at least one ultrasound stimulus is a burst of ultrasound signals.

In one embodiment, the at least one ultrasound stimulus is a multi-frequential ultrasound stimulus.

In one embodiment, the at least one ultrasound stimulus is a multi-frequential ultrasound stimulus with different frequencies focusing at different spatial locations.

In one embodiment, the at least one ultrasound stimulus is unfocused. In one embodiment, the at least one ultrasound stimulus is simultaneously focused at multiple locations. In one embodiment, the at least one ultrasound stimulus is composed of several ultrasonic beams successively focused at different locations within the whole duration of the ultrasound stimulus. In one embodiment, the at least one ultrasound stimulus is a complex structured spatial and temporal ultrasound pattern.

In one embodiment, the at least one ultrasound stimulus is emitted by a module (A) comprising an ultrasound array comprising at least one ultrasonic element.

In one embodiment, the neuronal cells or extensions thereof are located in cortical areas including visual cortex, prefrontal cortex, sensory cortex, motor cortex, auditory cortex, Broca's area, Wernicke's area and association areas; or in subcortical areas including basal ganglia, thalamus, hypothalamus, brainstem, hippocampus, amygdala; or in the spinal cord, or the neuronal cells are located in the retina, in the cochlea or in the vestibule. In one embodiment, the neuronal cells are cortical neurons of the visual cortex, neurons of the lateral geniculate nucleus or retinal ganglion cells.

In one embodiment, said method is for inducing vision of an image in a subject. In one embodiment, said method is for inducing vision of an image in a subject having impaired visual functions. In one embodiment, the at least one ultrasound stimulus is a complex structured spatial and temporal ultrasound pattern obtained from the coding of the image information. In one embodiment, the visual impairment results from diabetic retinopathy, glaucoma, optic neuropathies or trauma.

In one embodiment, said mechanosensitive channels are selected from the group comprising or consisting of Piezo channels, MscLs (large-conductance mechanosensitive channels) and CFTR (cystic fibrosis transmembrane conductance regulator) channels. In one embodiment, the mechanosensitive channels are MscLs, preferably MscL-G22s. In one embodiment, the mechanosensitive channel, such as, for example, MscL-G22s, is fused to a reporter protein, such as, for example, a cytoplasmic soluble protein, preferentially to tdTomato protein.

In one embodiment, a recombinant nucleic acid encoding the exogenous mechanosensitive channels is or was introduced into neuronal cells.

In one embodiment, the vector or the recombinant nucleic acid encoding the mechanosensitive channels comprises a cell-type specific promoter, preferably a neuron-specific promoter, more preferably the promoter is selected among the group comprising or consisting of the CAG promoter, the CAMKII promoter, the SNCG promoter, the CMV promoter, the synapsin I promoter and the EF-1a promoter. In one embodiment, the vector or the recombinant nucleic acid encoding the mechanosensitive channels comprises an ER export signal to drive expression to the plasma membrane, more preferably the Kir2.1.

In one embodiment, said vector is a viral vector, preferably selected from the group consisting of adeno associated viruses (AAV), adenoviruses, lentiviruses and herpes simplex viruses. In one embodiment, said vector is an AAV, preferably an AAV selected from the group comprising or consisting of AAV1, AAV2, AAV5 and AAV9 serotypes, more preferably the vector is an AAV9 or an AAV2. In one embodiment, the vector is selected from the group comprising or consisting of AAV1-7m8, AAV2-7m8, AAV5-7m8 and AAV9-7m8 serotypes, preferably the vector is an AAV9-7m8 or an AAV2-7m8. In one embodiment, said vector is an AAV9-7m8 comprising a nucleic acid sequence encoding MscL-G22s fused to tdTomato and a CamKII promoter.

In one embodiment, the recombinant nucleic acid encoding the mechanosensitive channels is or was introduced into said cells by infection with a virus, preferably selected from the group comprising or consisting of adeno associated viruses (AAV), adenoviruses, lentiviruses, herpes simplex viruses, preferably the virus is an AAV.

The present invention further relates to a vector, preferably a viral vector, and more preferably an AAV vector comprising a nucleic acid sequence encoding a mechanosensitive channel, optionally fused to a reporter protein, a promoter and optionally an endoplasmic reticulum export signal. In one embodiment, the AAV vector is an AAV vector selected from the group comprising or consisting of AAV1, AAV2, AAV5 and AAV9 serotypes, more preferably the vector is an AAV9 or an AAV2. In one embodiment, the vector is selected from the group comprising or consisting of AAV1-7m8, AAV2-7m8, AAV5-7m8 and AAV9-7m8 serotypes, preferably the vector is an AAV9-7m8 or an AAV2-7m8. In one embodiment, said AAV vector is an AAV9-7m8 comprising a nucleic acid sequence encoding MscL-G22s fused to tdTomato and a CamKII promoter.

BRIEF DESCRIPTION OF THE DRAWINGS

FIG. 1 (A-C) and FIG. 1 (D-E) are combinations of histograms and graphs showing that MscL (large-conductance mechanosensitive channels) elicited functional responses of retinal ganglion cells. A: Cell density of RBPMS positive, MscL positive and double-labelled cells for 5 MscL G22s and 5 MscL WT (wild type) retinas. B: Representative Peri-stimulus time histograms of three RGCs expressing MscL showing a short latency and a sustained response after 15 MHz US (ultrasound) stimulus onset. Scale bars represent 10 spikes per bin. Grey boxes represent stimuli of 200 ms. C: Average of the maximum number of cells per retina responding to a 15 MHz US (ultrasound) stimulus for MscL (MscL WT and G22s) (n=9) and WT (n=4) retinas by either a Long or Short latency response. D: Percentage of responsive RGCs to US stimuli of increasing US pressure for MscL (MscL WT and G22s) expressing retina (n=8) and non-transfected retinas (n=4).*, $p=0.0382$, **, $p=0.0065$, *, $p=0.0218$, unpaired t test. E: Responding short latency RGC cells to US stimuli of increasing pressure for MscL WT (n=3) and MscL G22s (n=5) retinas. , $p=0.006$, , $p=0.0035$, unpaired t test. For all panels error bars represent the SEM (standard error of the mean).

FIG. 2 (A-E) and Figure (F-H) are combinations of histograms and graphs showing the spatio-temporal properties of sonogenetic retinal responses. A-B: Spike density functions of two representative retinal ganglion cells (RGCs) of a MscL G22s expressing retina for increasing stimulus durations (A) and stimulus repetition frequency (B), scale bar is 100 Hz and 50 Hz respectively. C: Average maximum firing rate for different stimulus duration and mean Fano Factor values for all cells (n=9 retinas except for 10, 20 ms stimulus duration n=8). D: Correlation between response duration and stimulus duration confirmed by the linear regression line (n=9 retinas). E: Average maximum firing rate for different stimulus repetition frequencies and mean Fano Factor values for all cells (n=9 retinas except for 5 and 10 Hz stimulus frequency n=8). F-G: Average Euclidean distance between activated cells weighted to the maximum firing rate (F) and ratio of the number of activated cells (G) to the stimulated area on the MEA chip for the three US frequencies. **, $p<0.0001$, *, $p=0.0008$, $p=0.0169$, unpaired t test. n=12 retinas for 0.5 MHz, n=5 retinas for 2.25 MHz, n=9 retinas for 15 MHz. H: Relative displacement of the center of response following the 15 MHz US transducer displacement. ****, $p<0.0001$, $p=0.0018$, unpaired t test. n=9, 9, 6 positions for 4, 4 and 2 retinas for 0, 0.4 and 0.8 mm displacement respectively. US pressure: 1.1 MPa. For all panels error bars represent the SEM.

FIG. 3 (A-C), FIG. 3 (D-F), FIG. 3 (G-J), FIG. 3(K-L), and FIG. 3(M-N) are combinations of graphs, schemas and histograms showing the in vivo sonogenetic activation of V1 neurons expressing the MscL-G22s protein. A: Schematic illustration of the setup used for in vivo electrophysiological recordings and US stimulation. B: Left. (Top) Representative visual evoked cortical potentials to a 100 ms flash where typical P0, N1 and P1 deflections are visible. (Bottom) Representative responses to a 100 ms 15 MHz US stimulus of a WT rat with cortical neurons expressing the MscL-G22s protein. Right. Representative sonogenetic evoked potentials for a 15 MHz US stimulus of increasing duration. Black traces represent the average evoked potential over 100 trials. Each grey trace represents one trial. The black arrow depicts the start of the stimulus. Scale bars are 50 µV/50 ms. C: Sonogenetic µEcog response duration for 10, 20 and 50 ms stimuli (n=58, 32 and 56 trials on 6 animals respectively). D-F: N1 peak amplitude for increasing US pressure (D), increasing duration (E) and frequency (F) (Stimulus duration: 10 ms) (n=6 animals). G-H: Grey coded activation maps for stimuli of increasing US pressure (G) and for a displacement of 0.8 mm of the US transducer (H) (the arrow indicates the direction of the displacement). Each white dot represents an electrode of the electrode array. Greybar represents N1 peak amplitude in µV. I: Activated area at increasing US pressure values (n=6 animals). J: Displacement of the activation center to the previous position when US transducer moved of 0.4 mm. $p<0.0001$. one sample t test, n=37 positions on 6 animals. K: Representative spike density function (SDF) of responses to visual and US stimuli for a WT rat expressing the MscL-G22s protein in cortical neurons, scale bars represent 50 Hz. L: SDF of responses of 58 and 27 neurons to stimuli of different stimulus duration (top) and frequency (bottom). The top line shows the firing rate of the responses to stimuli duration from 50 to 10 ms (1 Hz stimulus frequency and frequency varying from 1 Hz to 13 Hz (10 ms stimulus duration). The bottom lines show the pattern of the stimuli. US pressure: 1 MPa. M: Average response latency following 50 and 10 ms long US stimuli (50 ms n=58 cells, 7 animals; 10 ms, n=27 cells, 5 animals). N: Depth of US responding cells (n=58) in MscL-G22s expressing rats (n=7). For all panels error bars represent the SEM.

FIG. 10 (A-B) and FIG. 10 (C-E) are combinations of schemas and graphs showing the impact of ultrasonic transmit frequency for visual restoration through the intact dura mater. A: Envisioned concept of visual restoration using US matrix arrays implanted in a cranial window for localized US neuromodulation of the primary visual cortex in humans. The US beam can adaptively focuses at different locations in V1 cortex while passing through the intact dura mater, subdural and subarachnoid spaces. B: Proof of concept setup used for V1 sonogenetic activation in rodents, using a high frequency focused transducer on a craniotomized mouse. C Characterization of the radiated field for the 0.5 MHz transducer used in this study. (top) Longitudinal view of the maximal pressure for a monochromatic acoustic field radiated at 0.5 MHz by the 25.4 mm Ø, 31.75 mm focus transducer. Pressure maximum is reached at 25.9 mm, slightly closer to the transducer than the geometrical focal point which is a documented effect 63. (middle) Transverse section of the maximal pressure field at depth z=25.9 mm. (bottom) One dimensional profile of this transverse section giving the FWHM (full width at tenth maximum) of the focal spot (4.36 mm at 0.5 MHz). D: Same characterization for the 2.25 MHz 12.7 mm Ø 25.4 mm focus transducer. E: Same characterization for the 15 MHz 12.7 mm Ø 25.4 mm focus transducer. Notice that the maximum pressure is reached very close to the geometrical focus (25.21 mm compared to 25.4 mm for the geometrical focus) for this configuration. FWHM of the focal spot is 0.276 mm.

FIG. 11 (A-B), FIG. 11 (C-D), and FIG. 11 (E-F) are combinations of graphs showing the simulated acoustic fields and temperature increases. A: Comparison between a water tank measurement at focus using a calibrated hydrophone (black) obtained with the 2.25 MHz transducer and reaching-1.11 MPa peak negative pressure, and a simulated waveform at focus (grey) reaching the same negative pressure. The two waveforms match very well (0.42% error) ensuring adequacy of our simulation setup and physical parameters. B: Power spectral density of the measured (black) and simulated (grey) waveforms, showing that simulation enable to estimate the importance of the non-linear propagation. A second harmonic 20 dB below the fundamental indicates a factor 100 in terms of energy, meaning that absorption can be calculated in a linear approximation. C-F: Thermal simulations are performed using a two-fold process corresponding to a worst-case scenario (see methods): propagation in a water medium, and thermal absorption in a brain mimicking medium. C: 3D temperature map at the end of a 200 ms stimulation (at 15 MHz and 1.27 MPa). D: Temperature rise at focus for a 15 MHz 200 ms stimulation with the 7 values of pressure (0.26, 0.39, 0.54, 0.74, 0.96, 1.15, 1.27 MPa). A zoom on the increasing curve reveals the fluctuations due to the 1 kHz on-off cycles. E: Temperature rise at focus for a 15 MHz 50 ms stimulation with the same 7 values of pressure. F: Temperature rise at focus for 15 MHz 10 ms stimulations (1 kHz modulation) at a repetition rate of 8 Hz and 13 Hz, for focus pressures of 0.96 MPa and 0.54 MPa.

DETAILED DESCRIPTION

Figure 4:
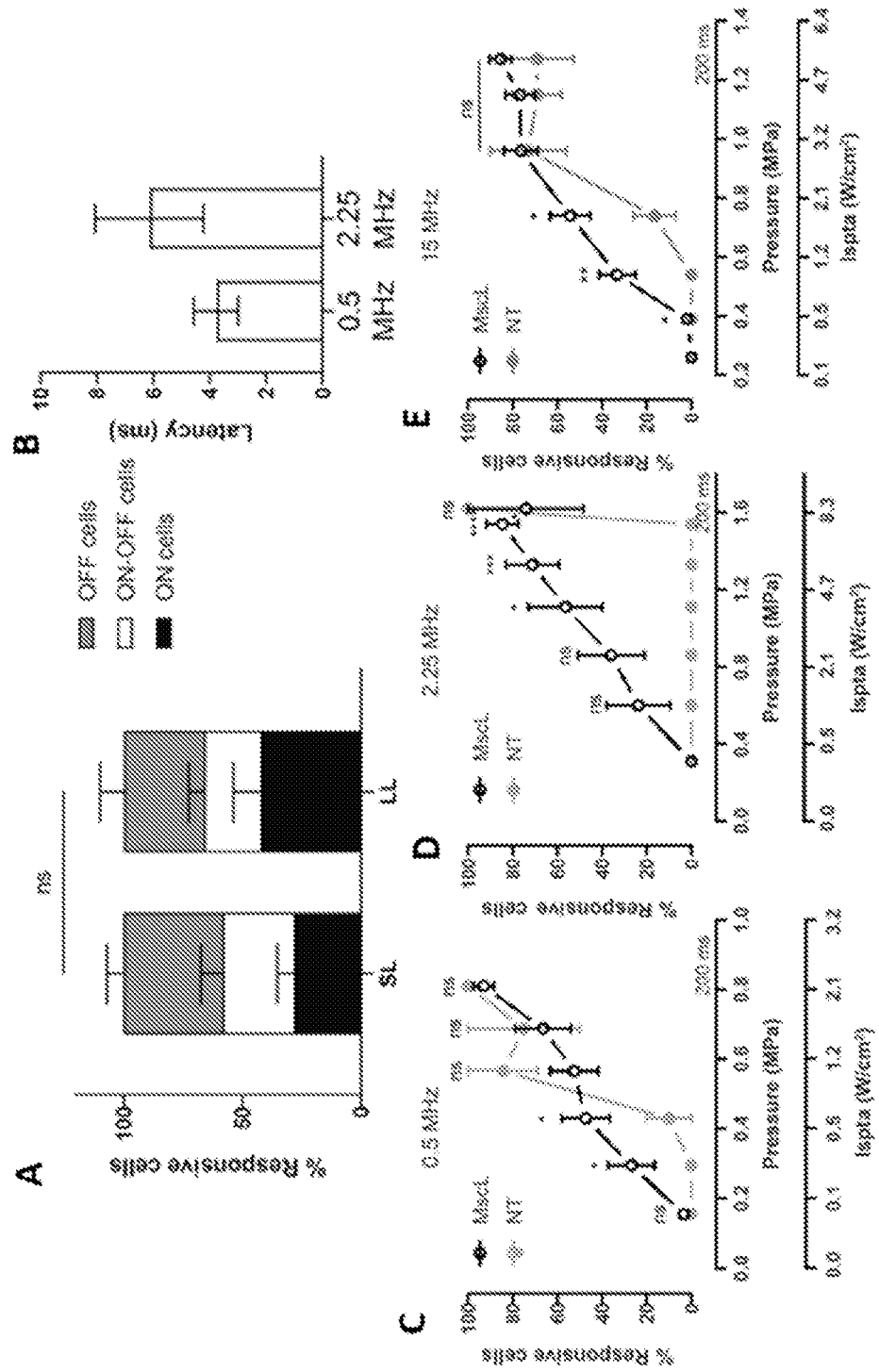
FIG. 4 is a combination of graphs and histograms showing the retinal sonogenetic responses characteristics for different frequency US stimuli. A: Classification of short latencies (SL) and long latencies (LL) responses to a 15 MHz stimulus according to their responses to a light stimulation. ns: p=0.3, 0.6, 0.5 (ON, ON-OFF and OFF cells), unpaired t-test, n=9 retinas. B: Average responses latencies of SL cells for 0.5 and 2.25 MHz US stimuli. n=9, 8 retinas, US pressure: 0.43, 1.54 MPa for 0.5 and 2.25 MHz respectively. C-E: Percentage of responding cells to a US stimulus of increasing acoustic pressure (normalized to the maximum number of responsive cells in the experiment) for the three tested US frequencies: 0.5 MHz (C, ns, p=0.1661;*, p=0.0292; *, p=0.0260; ns, p=0.8628; ns, p=0.1316; ns, p=0.7731; unpaired t test), 2.25 MHz (D, ns, p=0.1474; ns, p=0.0522; *, p=0.0140; *, p=0.0005; ****, p<0.0001; ns, p=0.5000; unpaired t test), 15 MHz (E, *, p=0.0382;**, p=0.0065; *, p=0.0218; ns, p=0.8628; ns, p=0.5859; ns, p=0.4223; unpaired t test). The bottom x axis represented the corresponding acoustic intensity (Ispta). For all panels error bars represent the SEM.

"About" preceding a figure means plus or less 10% of the value of said figure.

"Chirp" refers to a signal in which the frequency increases ('up-chirp') or decreases ('down-chirp') with time.

"Cystic fibrosis transmembrane conductance regulator" (CFTR) refers to an anion and intracellular ligand-gated channel associated with cystic fibrosis. CFTR is activated by membrane stretch.

"Cortical area" refers to a spatially confined unit of the cerebral cortex, which consists in the convoluted surface layer of gray matter of the cerebrum. Cortical areas include, without being limited to, prefrontal cortex, visual cortex, sensory cortex, motor cortex, auditory cortex, Broca's area, Wernicke's area and association areas.

"Deficit" refers to a lack or impairment in mental or physical functioning. The term "sensory deficit" encompasses a wide arrange of symptoms which can include difficulties with one of the main senses like vision, hearing, touch or taste, or difficulties with multiple senses.

"Event" refers to a change in a scene.

"Functional Magnetic resonance imaging" or "fMRI" refers to a technique using magnetic resonance (MR) technology to image the local brain neuronal activation thanks to the neurovascular coupling.

"Functional Ultrasound imaging" or "fUS imaging" refers to a technique using ultrasound technology to image the local brain neuronal activation thanks to the neurovascular coupling.

"Functional Near Infrared Microscopy" or "fNIRS" refers to a technique using Near InfraRed Spectroscopy technology to image the local brain neuronal activation thanks to the neurovascular coupling.

"Identity" or "Identical", when used in a relationship between the sequences of two or more amino acid sequences, refers to the degree of sequence relatedness between amino acid sequences, as determined by the number of matches between strings of two or more amino acid residues. "Identity" measures the percent of identical matches between the smaller of two or more sequences with gap alignments (if any) addressed by a particular mathematical model or computer program (i.e., "algorithms") Identity of related amino acid sequences can be readily calculated by known methods. Such methods include, but are not limited to, those described in Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part 1, Griffin, A. M., and Griffin, H. G., eds., Humana Press, New Jersey, 1994; Sequence Analysis in Molecular Biology, von Heinje, G., Academic Press, 1987; Sequence Analysis Primer, Gribskov, M. and Devereux, J., eds., M. Stockton Press, New York, 1991; and Carillo et al., SIAM J. Applied Math. 48, 1073 (1988). Preferred methods for determining identity are designed to give the largest match between the sequences tested. Methods of determining identity are described in publicly available computer programs. Preferred computer program methods for determining identity between two sequences include the GCG program package, including GAP (Devereux et al., Nucl. Acid. Res. \2, 387 (1984); Genetics Computer Group, University of Wisconsin, Madison, Wis.), BLASTP, BLASTN, and FASTA (Altschul et al., J. Mol. Biol. 215, 403-410 (1990)). The BLASTX program is publicly available from the National Center for Biotechnology Information (NCBI) and other sources (BLAST Manual, Altschul et al., NCB/NLM/NIH Bethesda, Md. 20894; Altschul et al., supra). The well-known Smith Waterman algorithm may also be used to determine identity "Mechanosensitive channel" refers to a class of ion channels which respond on the mechanical stimuli such as touch, hearing, crowing, stretch and cell volume within a lipid bilayer.

"Mechanosensitive channel of large conductance" (MscL) refers to a family of transmembrane channel proteins identified in bacteria, which open in response to the stretching of the membrane. MscL is non-selective for both anions and cations and forms a large nonselective channel (diameter 30-40 Å) with a large unitary conductance (~3 nS). Regarding the channel structure, the MscL from *Escherichia coli* comprises 136 amino acids in each of five identical subunits.

"Native form", "original form" or "wild type form" of a protein refers to a protein in its natural, non-mutated (unchanged) form. Accordingly, a "native", an "original" or a "wild type" protein is one that has the same amino acid sequence as a protein derived from nature (e.g., from any species). Such native proteins can be isolated from nature or can be produced by recombinant or synthetic means. A protein variant, as the term is used herein, is a protein that typically differs from a protein specifically disclosed herein (e.g. a mechanosensitive channel) in one or more substitutions, deletions, additions and/or insertions. Such variants may be naturally occurring or may be synthetically generated, for example, by modifying one or more of the sequences of the invention and evaluating one or more biological activities of the protein as described herein and/or using any of a number of techniques well known in the art. Modifications may be made in the structure of the proteins of the present invention and still obtain a functional molecule that encodes a variant or derivative protein with desirable characteristics. When it is desired to alter the amino acid sequence of a protein to create an equivalent, or even an improved, variant or region of a protein of the invention, one skilled in the art will typically change one or more of the codons of the encoding DNA sequence. For example, certain amino acids may be substituted for other amino acids in a protein structure without appreciable loss of their biological functional activity. Certain amino acid sequence substitutions can be made in a protein sequence, and of course, its underlying DNA coding sequence, and nevertheless obtain a protein with similar properties. It is thus contemplated that various changes may be made in the amino acid sequences of the disclosed compositions, or corresponding DNA sequences that encode said proteins without appreciable loss of their biological utility or activity. In many instances, a protein variant will contain one or more conservative substitutions. A "conservative substitution" is one in which an amino acid is substituted for another amino acid that has similar properties, such that one skilled in the art of peptide chemistry would expect the secondary structure and hydropathic nature of the protein to be substantially unchanged. As outlined above, amino acid substitutions are generally therefore based on the relative similarity of the amino acid side-chain substituents, for example, their hydrophobicity, hydrophilicity, charge, size, and the like. Exemplary substitutions that take several of the foregoing characteristics into consideration are well known to those of skill in the art and include: arginine and lysine; glutamate and aspartate; serine and threonine; glutamine and asparagine; and valine, leucine and isoleucine Amino acid substitutions may further be made on the basis of similarity in polarity, charge, solubility, hydrophobicity, hydrophilicity and/or the amphipathic nature of the residues. For example, negatively charged amino acids include aspartic acid and glutamic acid; positively charged amino acids include lysine and arginine; and amino acids with uncharged polar head groups having similar hydrophilicity values include leucine, isoleucine and valine; glycine and alanine; asparagine and glutamine; and serine, threonine, phenylalanine and tyrosine. Other groups of amino acids that may represent conservative changes include: (1) ala, pro, gly, glu, asp, gln, asn, ser, thr; (2) cys, ser, tyr, thr; (3) val, ile, leu, met, ala, phe; (4) lys, arg, his; and (5) phe, tyr, trp, his. A variant may also, or alternatively, contain non-conservative changes. In a preferred embodiment, variant proteins differ from a native sequence by substitution, deletion or addition of five amino acids or fewer. Variants may also (or alternatively) be modified by, for example, the deletion or addition of amino acids that have minimal influence on the secondary structure and hydropathic nature of the protein.

"Piezo family" refers to a family of excitatory ion channels directly gated by mechanical forces. These ion channels are involved in cell mechano-transduction, i.e. the conversion of mechanical forces into biological signals. Most vertebrates have two channel isoforms: Piezo1 and Piezo2.

"Promoter" refers to a site in a DNA (deoxyribonucleic acid) molecule at which RNA (ribonucleic acid) polymerase and transcription factors bind to initiate transcription of messenger RNA (mRNA). Promoter sequences are typically located directly upstream or at the 5' end of the transcription initiation site. Promoter sequences define the direction of transcription and indicate which DNA strand will be transcribed; this strand is known as the sense strand. A cell-type specific promoter is a promoter that has activity in only a certain cell type. A neuron-specific promoter is a promoter that has activity in neurons only, or in a certain type of neurons only. Use of a cell-type specific or a neuron-specific promoter in a vector can restrict unwanted transgene expression as well as facilitate persistent transgene expression.

"Protein" refers to a functional entity formed of one or more peptides or polypeptides, and optionally of non-polypeptides cofactors.

"Random coda" refers to a signal whose instantaneous frequency is randomly changing versus time.

"Recombinant nucleic acid" refers to molecules that are constructed by joining nucleic acid molecules (such as DNA or RNA) and can replicate in a living cell.

"Reporter protein" refers to a protein encoded by a reporter gene, usually driven by a promoter. The reporter gene is a nucleic acid sequence encoding for easily assayed proteins. For example, fusing a fluorescent reporter gene, such as green fluorescent protein (GFP), to a protein of interest allows to observe the location and trafficking of the protein in live cells and tissues.

"Restoration" refers to the act of returning to a normal or healthy condition. The restoration may be partial (i.e. when the subject returns to a condition which is below the normal or healthy condition) or total (i.e. when the subject returns to a condition which is identical or almost identical to a normal or healthy condition).

"Retina" refers to the nerve layer that lines the back of the eye, senses light, and creates impulses that travel through the optic nerve to the brain.

"Retinal ganglion cell" is a type of neuron located near the inner surface (the ganglion cell layer) of the retina. It receives visual information from photoreceptors via three main intermediate neuron types: bipolar cells, horizontal cells and amacrine cells.

"Sensor" refers to a device that receives stimuli commonly detected by one of the five senses of sight, hearing, touch, smell and taste.

"Sensory ability" refers to the ability of the sense organs to receive input accurately from the sense organs (e.g. eye, ear, tongue, nose and skin).

"Subcortical area" refer to a structure below the cerebral cortex. Subcortical structures are not visible when looking at the surface of the brain and include, without limitation, basal ganglia (striatum, globus pallidus, ventral *pallidum*, substantia nigra and subthalamic nucleus), thalamus, hypothalamus, brainstem, hippocampus and amygdala.

"Subject" refers to a warm-blooded animal, preferably a mammalian subject, more preferably a human Among the non-human mammalian subjects of interest, one may non-limitatively mention pets, such as dogs, cats, guinea pigs; animals of economic importance such as cattle, sheep, goats, horses, monkeys. In one embodiment, the subject is a patient, i.e. the subject is awaiting the receipt of, or is receiving medical care or is/will be the object of a medical procedure, or is monitored for the development of a disease, disorder or condition. In another embodiment, the subject is a healthy individual.

"Transgenic method" refers to a method of introducing a foreign (recombinant) nucleic acid into a host organism's genome. The foreign nucleic acid or "transgene" that is to be transferred to the recipient can be from other individuals of the same species or even from unrelated species.

"Unfocused" when referring to an ultrasound stimulus, preferably a burst of ultrasound signals, refers to an ultrasound stimulus that is not focalized at only one focal point (wherein a focalized ultrasound stimulus is an ultrasound stimulus with only one focal point during the whole duration of the stimulus, preferably a burst of ultrasound signals). Within the meaning of the invention, an unfocused ultrasound stimulus, preferably an unfocused burst of ultrasound signals, includes, without being limited to, the following configurations: the ultrasound stimulus may be simultaneously focused at multiple locations (i.e. multifocal stimulus), an ultrasound stimulus composed of several ultrasonic beams successively focused at different locations within the whole duration of the ultrasound stimulation, or the ultrasound stimulus may be any kind of complex structured spatial and temporal ultrasound pattern.

"Vascular ultrasound" refers to a technique using high-frequency sound waves to create images to detect the rate of blood flow through blood vessels. Ultrasound imaging can be used to detect blood clots and narrowed blood vessels throughout the body.

"Viral vector" is intended to refer to a non-wild-type recombinant viral particle that functions as a gene delivery vehicle and which comprises a recombinant viral genome packaged within a viral (e.g.: AAV) capsid. A specific type of virus vector may be a "recombinant adeno-associated virus vector", or "AAV vector".

"Virus" refers to an infectious agent of small size and simple composition that can multiply only in living cells of animals, plants, or bacteria. A virus particle comprises a genome housed inside a protein shell, or capsid. The genome of a virus may consist of single-stranded or double-stranded DNA or RNA and may be linear or circular in form. Viruses such as lentiviruses, adeno-associated viruses, adenoviruses and herpes simplex viruses are used for transferring genes into cells such as neurons.

"Ultrasound stimulus" refers to a stimulus in the form of an acoustic pressure wave. In the present invention, an ultrasound stimulus is delivered to neurons and generated with a transducer array composed of a set of at least one element.

The present invention relates to a method for reversibly stimulating neuronal cells in a subject, wherein said method comprises exposing neuronal cells expressing mechanosensitive channels (preferably exogenous mechanosensitive channels) to at least one ultrasound stimulus ranging from about 4 MHz to about 20 MHz central frequency.

In one embodiment, the method for reversibly stimulating neuronal cells in a subject comprises:
  (i) expressing exogenous mechanosensitive channels in the neuronal cells, and
  (ii) exposing the neuronal cells expressing the mechanosensitive channels to at least one ultrasound stimulus ranging from about 4 MHz to about 20 MHz central frequency.

In one embodiment, step (i) comprises a step of transducing neuronal cells with a vector comprising a nucleic acid sequence encoding a mechanosensitive channel, thereby inducing expression of exogenous mechanosensitive channels by the neuronal cells.

In one embodiment, the at least one ultrasound stimulus ranges from about 5 to about 18 MHz central frequency, such as, for example, from about 12 to about 16 MHz central frequency. In one embodiment, the at least one ultrasound stimulus is of about 4 MHz, or of about 5, 6, 7, 8, 9, 10, 11, 12, 13, 14, 15, 16, 17, 18, 19 or 20 MHz central frequency.

In one embodiment, the at least one ultrasound stimulus is of about 15 MHz central frequency.

In one embodiment, the neuronal cells or their extensions (synaptic terminals) are located in cortical areas.

Examples of cortical areas include, without being limited to, visual cortex, prefrontal cortex, sensory cortex, motor cortex, auditory cortex, Broca's area, Wernicke's area and association areas. Thus, in one embodiment, the neuronal cells or their extensions are located in the visual cortex, the prefrontal cortex, the sensory cortex, the motor cortex, the auditory cortex, the Broca's area, the Wernicke's area and the association areas In one embodiment, the neuronal cells or their extensions (synaptic terminals) are located in subcortical areas.

Examples of subcortical areas include, without being limited to, basal ganglia, thalamus, hypothalamus, brainstem, hippocampus and amygdala. Thus, in one embodiment, the neuronal cells or their extensions are located in the basal ganglia, the thalamus, the hypothalamus, the brainstem, the hippocampus and the amygdala. In one embodiment, the neuronal cells or their extensions are located in the brainstem.

In one embodiment, the neuronal cells are located in the retina.

In one embodiment, the neuronal cells are located in the cochlea. In one embodiment, the neuronal cells are located in the vestibule.

In one embodiment, the neuronal cells or their extensions (synaptic terminals) are located in the spinal cord.

In one embodiment, the neuronal cells or their extensions (synaptic terminals) are located in the visual cortex. In one embodiment, the neuronal cells are cortical neurons of the visual cortex.

In one embodiment, the neuronal cells or their extensions (synaptic terminals) are located in the lateral geniculate nucleus. In one embodiment, the neuronal cells are neurons of the lateral geniculate nucleus.

In one embodiment, the neuronal cells are retinal ganglion cells.

In one embodiment, the at least one ultrasound stimulus has a peak acoustic pressure comprised between about 0.01 and about 2 MPa, preferably between about 0.5 to about 2 MPa, more preferably to about 0.1 to 2 MPa. In one embodiment, the at least one ultrasound stimulus has a peak acoustic pressure comprised between about 0.11 and about 1.6 MPa, more preferably between about 0.2 and about 1.4 MPa.

In one embodiment, the at least one ultrasound stimulus has a sonication duration (SD) comprised between about 0.1 and about 200 ms, preferably between about 1 and about 100 ms, more preferably between about 5 and about 50 ms. In one embodiment, the at least one ultrasound stimulus has a sonication duration comprised between about 10 and about 200 ms.

In one embodiment, the at least one ultrasound stimulus is repeated. In one embodiment, the at least one ultrasound stimulus is repeated with an inter-stimulus interval (ISI) comprised between about 0.001 and about 10 s, preferably between 0.01 and about 5 s, more preferably between about 0.01 and about 2 s.

In one embodiment, the at least one ultrasound stimulus has a peak acoustic pressure comprised between about 0.01 and about 2 MPa and a sonication duration comprised between about 0.1 and about 200 ms, and wherein said ultrasound stimulus is repeated with an inter-stimulus interval (ISI) between about 0.001 and about 10 s.

In one embodiment, the at least one ultrasound stimulus has a pulse repetition frequency (PRF) of about 1 kHz.

In one embodiment, the at least one ultrasound stimulus has a duty cycle (DC) of about 50%.

In one embodiment, the at least one ultrasound stimulus is a burst of ultrasound signals.

In one embodiment, the at least one ultrasound stimulus is a multi-frequential ultrasound stimulus, i.e. an ultrasound stimulus composed by a diversity of ultrasonic frequencies. In one embodiment, the multi-frequential ultrasound stimulus has different frequencies focusing at different spatial locations.

In one embodiment, the multi-frequential ultrasound stimulus enables fast repetition of short pulsed signals, chirps or random coda.

In one embodiment, the multi-frequential ultrasound stimulus enables the spatial focusing of different frequencies at different locations, such as, for example, focusing near the brain surface in upper layers of the cortex with a higher frequency and focusing at deeper location in the brain in deeper layers of the cortex or subcortical regions with a lower frequency.

In one embodiment, the at least one ultrasound stimulus is unfocused.

In one embodiment, the at least one ultrasound stimulus is simultaneously focused at multiple locations. Within the meaning of the invention, the term "multiple location" refers to at least two locations (e.g., 2, 3, 4, 5, 6, 7, 8, 9, 10, 20, 30, 40, 50, 60, 70, 80, 90, 100 or more than 100 locations). Thus, in one embodiment, the at least one ultrasound stimulus is a multifocal ultrasound stimulus.

In one embodiment, the at least one ultrasound stimulus is composed of several ultrasonic beams successively focused at different locations within the whole duration of the ultrasound stimulus, preferably a burst of ultrasound signals.

In one embodiment, the at least one ultrasound stimulus is a complex structured spatial and temporal ultrasound pattern. In one embodiment, said complex structured spatial and temporal ultrasound pattern insonifies a large region of interest whose dimensions are larger than the ultrasonic wavelength.

In one embodiment, the at least one ultrasound stimulus is obtained from the coding of a sensory information such as, for example, a visual, auditory, olfactory, balance, tactile or gustative information. In one embodiment, said at least one ultrasound stimulus is obtained from the coding of a visual information, thereby generating a complex structured spatial and temporal ultrasound pattern.

In one embodiment, the at least one ultrasound stimulus is emitted with the module (A) as described herein. In one embodiment, the at least one ultrasound stimulus is emitted by a module (A) comprising an ultrasound array comprising at least one ultrasonic element.

In one embodiment, the neuronal cells to be stimulated express an exogenous mechanosensitive channel.

In one embodiment, the neuronal cells to be stimulated express mechanosensitive channels in the cell body (or soma), in the extensions (or synaptic terminal) or in both regions. Thus, in one embodiment, the neuronal cells to be stimulated are stimulated at the soma level, at the synaptic terminal level or at both levels.

In one embodiment, the mechanosensitive channel is non-toxic to the neuronal cells, i.e. its expression by the neuronal cell does not affect cell survival.

In one embodiment, the mechanosensitive channel is a mammalian mechanosensitive channel from the Piezo family, such as, for example, Piezo1.

In one embodiment, the mechanosensitive channel is a CFTR (Cystic Fibrosis Transmembrane conductance Regulator) channel.

In one embodiment, the mechanosensitive channel is a channel from the MscL (bacterial mechanosensitive ion channel of large conductance) family.

In one embodiment, the mechanosensitive channels are selected from the group comprising or consisting of Piezo channels, MscLs (large-conductance mechanosensitive channels) and CFTR (cystic fibrosis transmembrane conductance regulator) channels.

In one embodiment, the mechanosensitive channel is a wild-type form (that may also be referred to as original or native form) of MscL. In one embodiment, the mechanosensitive channel is a wild-type form of MscL (SEQ ID NO: 1) from *Escherichia coli*.

```
                                          SEQ ID NO: 1
MASIIKEFREFAMRGNVVDLAVGVIIGAAFGKIVSSLVADIIMPPLGLL

IGGIDFKQFAVTLRDAQGDIPAVVMHYGVFIQNVFDFLIVAFAIFMAIK

LINKLNRKKEEPAAAPAPTKEEVLLTEIRDLLKEQNNRSASLVP
```

In one embodiment, the mechanosensitive channel is a mutated form of MscL. In one embodiment, the mechanosensitive channel is a mutated form of MscL from *Escherichia coli*. In one embodiment, the mechanosensitive channel is MscL-G22s (SEQ ID NO: 2). Within the meaning of the invention, the MscL-G22s is a mutated form of MscL in which the residue Glycine in position 22 (corresponding to residue 23 in SEQ ID NO: 1) has been replaced with a serine residue.

```
                                          SEQ ID NO: 2
MASIIKEFREFAMRGNVVDLAVSVIIGAAFGKIVSSLVADIIMPPLGLL

IGGIDFKQFAVTLRDAQGDIPAVVMHYGVFIQNVFDFLIVAFAIFMAIK

LINKLNRKKEEPAAAPAPTKEEVLLTEIRDLLKEQNNRSASLVP
```

Are also included in the present invention, protein variants of the wild type or the mutated form of MscL.

In one embodiment, a protein variant of the wild type form of MscL has an amino acid sequence sharing at least about 70%, 75%, 80%; 85%, 90%, 95%, 96%, 97%, 98% or at least about 99% of identity with the amino acid sequence of MscL (SEQ ID NO: 1).

In one embodiment, a protein variant of the mutated form of MscL has an amino acid sequence sharing at least about 70%, 75%, 80%; 85%, 90%, 95%, 96%, 97%, 98% or at least about 99% of identity with the amino acid sequence of MscL-G22s (SEQ ID NO: 2).

In one embodiment, the mechanosensitive channel, such as, for example, MscL-G22s, is fused to a reporter protein, such as a cytoplasmic soluble protein. Examples of reporter proteins include, without limitation, tandem dimer Tomato (tdTomato), *Discosoma* sp. Red fluorescent protein (DsRed), green fluorescence protein (GFP), enhanced GFP (EGFP), enhanced yellow fluorescent protein (EYFP).

In one embodiment, the mechanosensitive channel, such as, for example, MscL-G22s, is fused to tdTomato (SEQ ID NO: 3).

SEQ ID NO: 3
MVSKGEEVIKEFMRFKVRMEGSMNGHEFEIEGEGEGRPYEGTQTAKLKV

TKGGPLPFAWDILSPQFMYGSKAYVKHPADIPDYKKLSFPEGFKWERVM

NFEDGGLVTVTQDSSLQDGTLIYKVKMRGTNFPPDGPVMQKKTMGWEAS

TERLYPRDGVLKGEIHQALKLKDGGRYLVEFKTIYMAKKPVQLPGYYYV

DTKLDITSHNEDYTIVEQYERSEGRHHLFLGHGTGSTGSGSSGTASSED

NNMAVIKEFMRFKVRMEGSMNGHEFEIEGEGEGRPYEGTQTAKLKVTKG

GPLPFAWDILSPQFMYGSKAYVKHPADIPDYKKLSFPEGFKWERVMNFE

DGGLVTVTQDSSLQDGTLIYKVKMRGTNFPPDGPVMQKKTMGWEASTER

LYPRDGVLKGEIHQALKLKDGGHYLVEFKTIYMAKKPVQLPGYYYVDTK

LDITSHNEDYTIVEQYERSEGRHHLFLYGMDELYK

In one embodiment, in order to induce the expression of an exogeneous mechanosensitive channel, a recombinant nucleic acid encoding said mechanosensitive channel is or has been introduced into neuronal cells. In one embodiment, the step of introducing the recombinant nucleic acid into the neuronal cell is not part of the method of the present invention.

In one embodiment, the recombinant nucleic acid encoding a mechanosensitive channel comprises a cell-type specific promoter, preferably a neuron-specific promoter.

In one embodiment, the recombinant nucleic acid encoding a mechanosensitive channel comprises a promoter specific for the cortical neurons.

In one embodiment, the recombinant nucleic acid encoding a mechanosensitive channel comprises a promoter specific for the retinal ganglion cells.

In one embodiment, the recombinant nucleic acid encoding a mechanosensitive channel comprises a promoter specific for the neurons of the lateral geniculate nucleus.

Examples of promoters that can be used in the present invention include, without limitation, the CAG (CMV early enhancer/chicken β-actin) promoter, the CAMKII (calcium/calmodulin-dependent protein kinase II) promoter, the SNCG promoter, the CMV promoter, the synapsin I promoter and the EF-1a promoter.

In one embodiment, the recombinant acid nucleic encoding a mechanosensitive channel comprises a promoter selected from the group comprising or consisting of the CamKII promoter, the CAG promoter and the SNCG promoter.

In one embodiment, the recombinant nucleic acid encoding a mechanosensitive channel comprises an endoplasmic reticulum (ER) export signal. In one embodiment, the recombinant nucleic acid encoding a mechanosensitive channel comprises the Kir2.1 ER export signal.

In one embodiment, the recombinant nucleic acid encoding a mechanosensitive channel is or has previously been introduced into neuronal cells by transgenic methods.

In one embodiment, the recombinant nucleic acid encoding a mechanosensitive channel is or has previously been introduced into neuronal cells by infection with a virus.

Examples of viruses that are suitable for the present invention include, without being limited to, adeno associated viruses (AAV), adenoviruses, lentiviruses, herpes simplex viruses.

In one embodiment, the virus is an AAV. In one embodiment, the virus is an AAV selected from the group comprising or consisting of AAV1, AAV2, AAV5 and AAV9 serotypes. In one embodiment, the virus is an AAV, such as, for example, an AAV9 serotype, or an AAV2 serotype.

In one embodiment, the virus comprises the 7m8 mutation. Thus, in one embodiment, the virus is an AAV selected from the group comprising or consisting of AAV1-7m8, AAV2-7m8, AAV5-7m8 and AAV9-7m8 serotypes, preferably the AAV is AAV2-7m8 or AAV9-7m8.

In one embodiment, the virus previously described is or has previously been introduced into the brain of the subject, such as, for example, by cranial surgery (stereotaxis). In one embodiment, the virus is or has previously been introduced in a specific region of the brain of the subject. In one embodiment, the virus is or has previously been introduced in a specific region of the brain of the subject by focusing an ultrasound beam in this region in order to locally permeabilize the Blood Brain Barrier (BBB) and injecting the virus in the vascularization. Thus, in one embodiment, the virus is or has previously been introduced in a specific region by injection in the vascularization.

In one embodiment, the recombinant nucleic acid encoding a mechanosensitive channel is or has previously been introduced into neuronal cells by transfection.

Examples of reagents that can be used in the present invention for the transfection include, without being limited to, in vivo-jet PEI (e.g. cGMP in vivo-jet PEI) (Polyplus transfection).

In one embodiment, the recombinant nucleic acid encoding a mechanosensitive channel and the reagent(s) required for the transfection are or have previously been introduced into the brain of the subject by a cranial surgery (stereotaxis). In one embodiment, the recombinant nucleic acid encoding a mechanosensitive channel and the reagent(s) required for the transfection are or have previously been introduced in a specific region of the brain of the subject.

The present invention thus presents the advantage to specifically stimulate neuronal cells, without inducing tissue warming and hemorrhage.

The present invention also presents the advantage to stimulate neuronal cells with a spatiotemporal resolution compatible with vision restoration.

In particular, the method of the invention enables to stimulate neuronal cells within a restricted area. In one embodiment, the method of the invention enables to stimulate neuronal cells within a restricted area of about 0.01 to about 1 mm$^2$, preferably of about 0.01 to about 0.1 mm$^2$.

In one embodiment, the method of the invention enables the stimulation of neuronal cells within an area of less than about 1 mm$^2$, preferably of less than about 0.50 mm$^2$, preferably of less than about 0.20 mm$^2$, preferably of less than about 0.10 mm$^2$.

In one embodiment, the method of the invention enables the stimulation of neuronal cells within an area of about 1 mm$^2$, about 0.90 mm$^2$, about 0.80 mm$^2$, about 0.70 mm$^2$, about 0.60 mm$^2$, about 0.50 mm$^2$, about 0.40 mm$^2$, about 0.30 mm$^2$, about 0.20 mm$^2$, about 0.10 mm$^2$, or about 0.05 mm$^2$.

In one embodiment, the method of the invention enables the stimulation of neuronal cells within an area of about 0.16 mm$^2$. In one embodiment, the method of the invention enables the stimulation of neuronal cells within an area of about 0.35 mm$^2$. In one embodiment, the method of the invention enables the stimulation of neuronal cells within an area of about 0.58 mm$^2$.

In one embodiment, the method of the invention enables the stimulation of neuronal cells in the order of about 10 ms. In one embodiment, the method of the invention enables to stimulate neuronal cells with a temporal resolution of the order of about 1 to 50 ms, e.g., of about 1, 2, 3, 4, 5, 6, 7, 8, 9 or 10 ms, or of about 20, 30, 40 or 50 ms.

In addition, when using an unfocused ultrasound stimulus, such as, for example, a patterned ultrasound stimulus (e.g., using an ultrasound array), a high spatiotemporal resolution may be obtained.

In particular, when using an unfocused ultrasound stimulus, such as, for example, a multifocal ultrasound stimulus, an ultrasound stimulus composed of several ultrasonic beams successively focused at different locations within the whole duration of the ultrasound stimulus or a complex structured spatial and temporal ultrasound pattern (e.g., using an ultrasound array), the method of the invention enables the stimulation of neuronal cells with a spatiotemporal resolution compatible with vision restoration (FIG. 6, 7A-C).

In one embodiment, the method of the present invention is for treating neurological disorders, wherein said treatment requires precise cortical and/or subcortical simulations.

Examples of neurological disorders requiring precise cortical and subcortical stimulations for treatment include, without being limited to, Parkinson's disease, Alzheimer's disease, diabetes, severe depression, essential tremor, epilepsy, schizophrenia, Amyotrophic lateral sclerosis (ALS), dementia, neuralgia, muscular dystrophy, neuromuscular diseases, obsessive-compulsive disorders, seizures, chronic fatigue syndrome, stroke, Guillain-Barré syndrome, multiple sclerosis, aphasia, pain.

In one embodiment, the method of the present invention is for enhancing a sensory ability in a subject, such as a visual, auditory, balance, olfactory, tactile and/or gustative ability.

In one embodiment, the method of the present invention is for restoring a sensory deficit in a subject.

In one embodiment, the method of the present invention is for restoring a visual, auditory, olfactory, balance, tactile and/or gustative deficit in a subject, preferably for restoring a visual deficit in a subject.

In one embodiment, the method of the present invention is for inducing vision of an image in a subject. In one embodiment, said subject has impaired visual functions. As used herein, impairment of visual function can be assessed by tests or methods well-known to the skilled artisan in the art, such as the Snellen test.

In one embodiment, the method of the present invention is for restoring vision of an image in a subject having impaired visual functions.

Thus, in one embodiment, the at least one ultrasound stimulus is obtained or derived from the coding of an image or an event-based visual information, thereby preferably generating a complex structured spatial and temporal ultrasound pattern.

In one embodiment, the image, the outlines of said image or the event-based visual information are extracted and coded to generate a complex structured spatial and temporal ultrasound pattern.

In one embodiment, the subject is a mammal, preferably a human. In one embodiment, the subject is a male. In another embodiment, the subject is a female.

In one embodiment, the subject is a child (for example a subject below the age of 18). In one embodiment, the subject is an adult (for example a subject above the age of 18).

In one embodiment, the subject has a deficit in a sensory ability, such as a visual, auditory, olfactory, balance, tactile and/or gustative deficit.

In one embodiment, the subject has impaired visual functions. In one embodiment, impairment of the visual functions results from a loss of connection between the eyes and the brain in the subject, i.e. the optical pathway. Thus, in one embodiment, the subject has lost eye-to-brain connection. In one embodiment, impairment of the visual functions results from dysfunctions of the eyes or of the optical pathway (resulting, for example, from eye malformation, infectious diseases, degenerative diseases (such as, for example, age-related macular degeneration), tumors, and/or vascular events (such as, for example, stroke)).

In one embodiment, impairment of the visual functions in the subject results from diabetic retinopathy, optic neuropathy (inherited or acquired), glaucoma or trauma.

In one embodiment, the method of the present invention further comprises a step of visualizing and/or monitoring the activation of the neuronal cells in the stimulated area.

In one embodiment, the visualization and/or monitoring of the activation of the neuronal cells is based on noninvasive functional imaging. Examples of noninvasive functional imaging methods include, without being limited to, functional magnetic resonance imaging (fMRI), functional ultrasound (fUS) imaging, functional Near Infrared Spectroscopy (fNIRS), electroencephalogram (EEG) or magnetoencephalogram (MEG) recording.

In one embodiment, the method of the invention further comprises a step of visualizing and/or monitoring the activation of the neuronal cells with fMRI. In one embodiment, the method of the invention further comprises a step of visualizing and/or monitoring the activation of the neuronal cells with fNIRS. In one embodiment, the method of the invention further comprises a step of visualizing and/or monitoring the activation of the neuronal cells with functional ultrasound. In one embodiment, the method of the invention further comprises a step of visualizing and/or monitoring the activation of the neuronal cells with EEG. In one embodiment, the method of the invention further comprises a step of visualizing and/or monitoring the activation of the neuronal cells with MEG.

In one embodiment, the visualization and/or monitoring of the activation of the neuronal cells is based on calcium imaging with a fluorescent calcium sensor (or calcium indicator). Examples of calcium sensors (or indicators) that can be used in the present invention include, without limitation, GCAMP, Fura-2, Indo-1, Fluo 3, Fluo 4, calcium green-1 and Oregon green 488 BAPTA-1.

Thus, in one embodiment, the method of the present invention further comprises the steps of:
  introducing a fluorescent calcium sensor or a nucleic acid sequence encoding said calcium sensor into the neuronal cells and,
  visualizing fluorescence emission from the fluorescent calcium sensor to visualize and/or monitor the activation of the neuronal cells.

In one embodiment, the step of introducing the fluorescent calcium sensor or the nucleic acid sequence encoding said sensor into the brain is not part of the method of the present invention.

In one embodiment, the visualization and/or monitoring of the activation of the neuronal cells is based on electrode recordings. In one embodiment, the step of introducing electrodes into the brain is not part of the method of the present invention.

Thus, in one embodiment, the method of the present invention further comprises a step of recording the neuronal activity with at least one electrode.

In one embodiment, the method of the present invention further comprises a step of recording the neuronal activity with at least one multi-electrode array.

In one embodiment, the method of the present invention further comprises a step of recording the neuronal activity with at least one µEcoG (micro-electrocorticography) electrode array.

The present invention also relates to the use of at least one ultrasound stimulus as described herein for reversibly stimulating neuronal cells in a subject, wherein said neuronal cells express mechanosensitive channels, and wherein said ultrasound stimulus has a central frequency of at least about 4 MHz, preferably of at least about 5, 6, 7, 8, 9, 10, 11, 12, 13, 14, 15, 16, 17, 18, 19 or 20 MHz central frequency. In one embodiment, the at least one ultrasound stimulus is ranging from about 4 MHz to about 20 MHz central frequency, preferably from about 5 to about 18 MHz central frequency, such as, for example, from about 12 to about 16 MHz central frequency. In one embodiment, the at least one ultrasound stimulus is of about 4 MHz, preferably of about 5, 6, 7, 8, 9, 10, 11, 12, 13, 14, 15, 16, 17, 18, 19 or 20 MHz central frequency. In one embodiment, the at least one ultrasound stimulus is of about 15 MHz central frequency.

The present invention also relates to the use of at least one ultrasound stimulus for inducing vision of an image in a subject, wherein said subject comprises neuronal cells expressing mechanosensitive channels, wherein said ultrasound stimulus has a central frequency of at least about 4 MHz, preferably of at least about 5, 6, 7, 8, 9, 10, 11, 12, 13, 14, 15, 16, 17, 18, 19 or 20 MHz central frequency, and wherein said neuronal cells are cortical neurons of the visual cortex, neurons of the lateral geniculate nucleus, or retinal ganglion cells. In one embodiment, the at least one ultrasound stimulus is ranging from about 4 MHz to about 20 MHz central frequency, preferably from about 5 to about 18 MHz central frequency, such as, for example, from about 12 to about 16 MHz central frequency. In one embodiment, the at least one ultrasound stimulus is of about 4 MHz, preferably of about 5, 6, 7, 8, 9, 10, 11, 12, 13, 14, 15, 16, 17, 18, 19 or 20 MHz central frequency. In one embodiment, the at least one ultrasound stimulus is of about 15 MHz central frequency.

The present invention further relates to an ultrasound system comprising means for implementing a method as described herein.

The system of the present invention is thus an ultrasound system configured to receive electrical signals as input to reversibly stimulate neuronal cells expressing mechanosensitive channels in a subject, wherein said ultrasound system comprises a module (A) comprising an ultrasound array comprising at least one ultrasonic element, for emitting at least one ultrasound stimulus of at least about 4 MHz, preferably of at least about 5, 6, 7, 8, 9, 10, 11, 12, 13, 14, 15, 16, 17, 18, 19 or 20 MHz central frequency. In one embodiment, the at least one ultrasound stimulus has a central frequency ranging from about 4 MHz to about 20 MHz central frequency, preferably from about 5 to about 18 MHz central frequency, such as, for example, from about 12 to about 16 MHz central frequency. In one embodiment, the at least one ultrasound stimulus has a central frequency of about 4 MHz, preferably of about 5, 6, 7, 8, 9, 10, 11, 12, 13, 14, 15, 16, 17, 18, 19 or 20 MHz central frequency. In one embodiment, the at least one ultrasound stimulus has a central frequency of about 15 MHz central frequency.

In one embodiment, the at least one ultrasound stimulus is unfocused.

In one embodiment, the module (A) is configured to emit bursts of ultrasound signals.

In one embodiment, the module (A) is configured to emit multi-frequential ultrasound stimuli. In one embodiment, said multi-frequential ultrasound stimuli enable fast repetition of short pulsed signals, chirps or random coda.

In one embodiment, the module (A) is configured to emit unfocused ultrasound stimuli.

In one embodiment, the module (A) is configured to emit ultrasound stimuli simultaneously focused at multiple locations.

In one embodiment, the module (A) is configured to emit ultrasound stimuli composed of several ultrasonic beams successively focused at different locations within the whole duration of the ultrasound stimuli, preferably bursts of ultrasound signals.

In one embodiment, the module (A) is configured to emit a complex structured spatial and temporal pattern. In one embodiment, said complex structured spatial and temporal pattern insonifies a large region of interest whose dimensions are larger than the ultrasonic wavelength.

In one embodiment, the ultrasound array comprising at least one ultrasonic element is an ultrasound matrix, a sparse array and/or a row-column addressed (RCA) array.

Figure 8A:
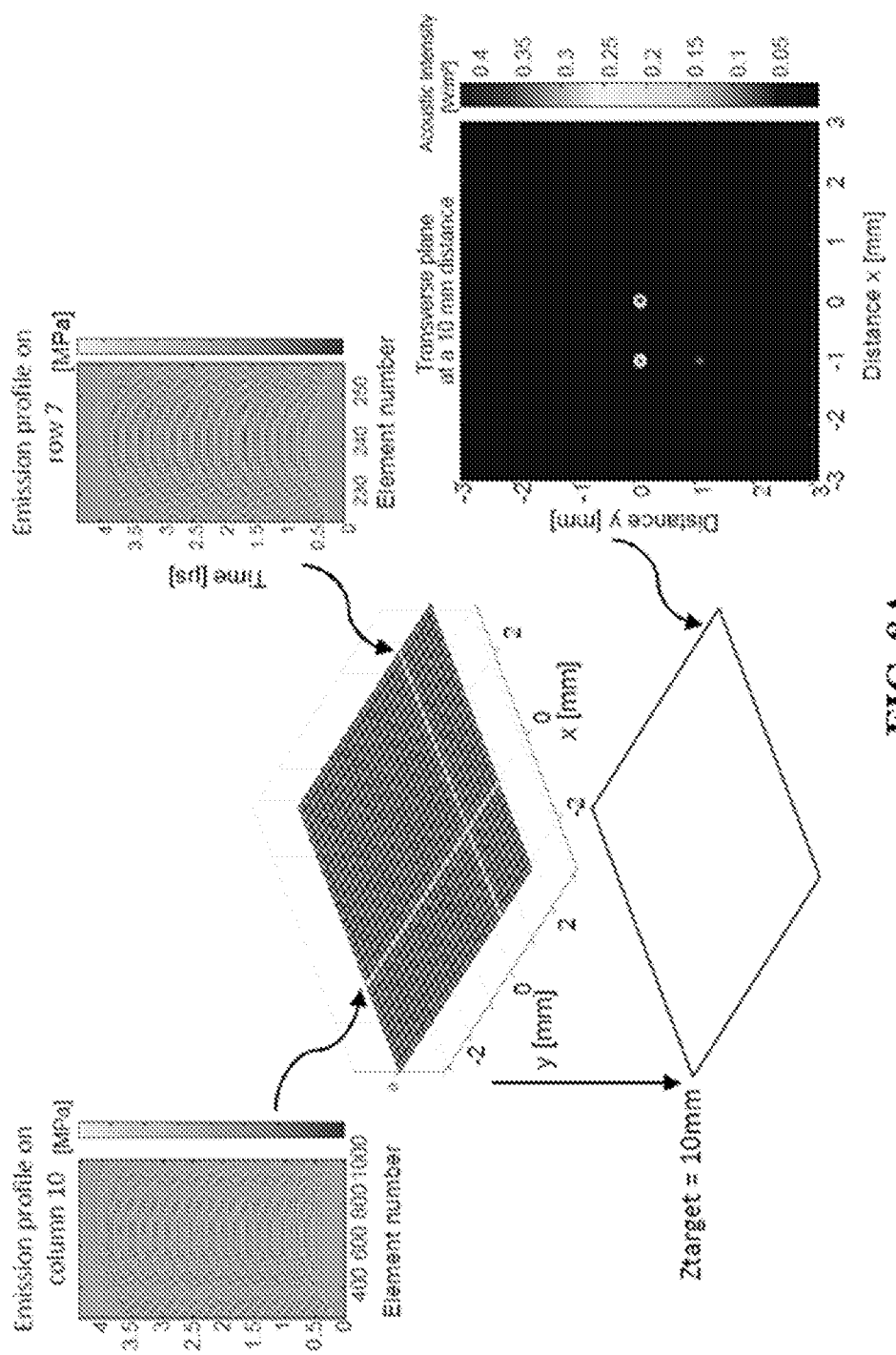
FIG. 8 and Figure (B-C) are combinations of illustrations showing an example of an ultrasound matrix array for emitting unfocused ultrasound stimuli. A: Illustration of a 32×32 matrix array (example configuration: 0.2 mm pitch, 15 MHz central frequency) configured to reach 3 focal points with long ultrasonic bursts: 2 focal points have the same amplitude whereas one focal point has a lower amplitude (one quarter of amplitude). A specific wave pattern emission is designed for each element (32 of those wave patterns are illustrated for column 10, and another 32 of those wave patterns are illustrated for row 7) in order to reach a given energy pattern in the target transverse plane (bottom right). B-C: Illustrations of examples of ultrasound patterns generated by an ultrasound matrix array. The image to project, (e.g., an image representing a checkerboard (B) or a more complex image (C)) is converted into an ultrasound pattern stimulation displaying the same pattern as the image to be created.

An example of an ultrasound matrix that can be used in the present invention is given in FIG. 8 (A-C).

In one embodiment, the at least one ultrasonic element is an ultrasound stimulus transducer with a central frequency of at least about 4 MHz, preferably of at least about 5, 6, 7, 8, 9, 10, 11, 12, 13, 14, 15, 16, 17, 18, 19 or 20 MHz central frequency. In one embodiment, the at least one ultrasonic element is an ultrasound stimulus transducer with a central frequency ranging from about 4 MHz to about 20 MHz central frequency, preferably from about 5 to about 18 MHz central frequency, such as, for example, from about 12 to about 16 MHz central frequency. In one embodiment, the at least one ultrasonic element is an ultrasound stimulus transducer with a central frequency of about 4 MHz, preferably of about 5, 6, 7, 8, 9, 10, 11, 12, 13, 14, 15, 16, 17, 18, 19 or 20 MHz central frequency. In one embodiment, the at least one ultrasonic element is an ultrasound stimulus transducer with a central frequency of about 15 MHz central frequency.

In one embodiment, the transducers used in the present invention are selected from piezo-composite elements, piezo-ceramic elements, capacitive micro-machined ultrasonic transducers, immersion transducers, polyvinylidene fluoride elements or other elements suitable for emitting ultrasound stimuli.

In one embodiment, the module (A) comprises a waveform generator able to program the electrical signals that are transmitted to the ultrasound array, preferably said electrical signals are transmitted on each ultrasonic element of the ultrasound array. In one embodiment, the waveform generator is connected to the ultrasound array via a cable or a remote connection. In one embodiment, the waveform generator comprises the following functions: a multimeter, an oscilloscope, a spectrum analyzer and a transient recorder.

In one embodiment, the module (A) comprises a power amplifier.

In one embodiment, the module (A) comprises means for transmitting the at least one ultrasound stimulus toward restricted and determined areas in the brain. Examples of means for transmitting the at least one ultrasound stimulus toward restricted and determined areas include, without being limited to, varying phase differences between emitters, or adding filters, lenses, capacitors or a mix of these means.

In one embodiment, the module (A) is comprised in a support that is implanted in the subject's skull (craniotomy). In one embodiment, the support is implanted subcutaneously in the subject's skull. In one embodiment, the support is implanted over the dura mater.

In one embodiment, the support is made with a biocompatible material. In one embodiment, the support is made with a material compatible with scanner, fMRI, fUS imaging, fNIRS imaging, EEG or MEG imaging.

In one embodiment, the ultrasound system further comprises electrical power supplies to supply electrical energy to the system. In one embodiment, the electrical power supplies consist of rechargeable batteries.

In one embodiment, the ultrasound system of the present invention is for enhancing a sensory ability in a subject, such as a visual, auditory, balance, olfactory, tactile and/or gustative ability.

In one embodiment, the ultrasound system of the present invention is for restoring a sensory deficit in a subject, such as a visual, auditory, balance, olfactory, tactile and/or gustative deficit.

Thus, in one embodiment, the ultrasound system of the present invention further comprises an electronic converter. This electrical converter converts the sensory signal that is to be detected by a subject into an electrical signal that is transmitted to the module (A) (or the waveform generator comprised in the module (A)) for emitting at least one ultrasound stimulus, in order to generate the sensory information into the brain through the stimulation of the neuronal cells.

In one embodiment, the sensory signal is emitted by a remote appliance, such as a sensor. Thus, in one embodiment, the electronic converter is connected to at least one sensor for converting the sensory signal sensed by the sensor into an electrical signal. Said sensor may sense visual, auditory, olfactory, tactile and/or gustative information.

Examples of sensors that can detect sensory information include, without limitation, cameras or neuromorphic vision sensors (visual), microphones (auditory), accelerometer or force balance sensors (balance), electronic noses (olfactory), touch sensors (tactile) and taste sensors (gustative).

In one embodiment, the sensory signal is a computerized sensory information generated by a device such as a computer. Thus, in one embodiment, the electronic converter is connected to a device that delivers computerized sensory information.

In one embodiment, the ultrasound system of the present invention is for restoring a visual deficit in a subject.

In one embodiment, the ultrasound system of the invention is for restoring the vision of an image in a subject and comprises one or more of the characteristics described below.

In one embodiment, the ultrasound system of the present invention is for inducing vision of an image by a subject and comprises one or more of the characteristics described below.

In one embodiment, the ultrasound system of the present invention comprises an acquisition module (B) to acquire an image or a visual information.

In one embodiment, the acquisition module (B) is a sensor capable of acquiring an image, such as a camera. Thus, in one embodiment, the system of the present invention comprises at least one camera to acquire an image. In one embodiment, the at least one camera is able to image in real time a visual scene.

In one embodiment, the acquisition module (B) is a sensor capable of acquiring visual information, such as a neuromorphic visual sensor or event-based camera. Thus, in one embodiment, the system of the present invention comprises at least one visual sensor to acquire visual information.

In one embodiment, the acquisition module (B), preferably a camera, further comprises a system to extract the outlines of an image or to extract outlines of moving objects and structures between successive images.

In one embodiment, the ultrasound system of the present invention comprises a processing module (C) configured to translate said image or visual information into electrical signals as output, that are transmitted to the module (A) (or the waveform generator comprised in the module (A)) for emitting at least one ultrasound stimulus, preferably complex structured spatial and temporal ultrasound patterns. In one embodiment, said image or visual information processing module (C) is connected to the acquisition module (B) by wired or wireless connection.

In one embodiment, the processing module (C) comprises an electronic system, software and algorithms. In one embodiment, the module (C) comprises an electronic converter, which converts the visual signal obtained with the acquisition module (B), into an electrical signal that is transmitted to the module (A) (or the waveform generator comprised in the module (A)) for emitting at least one ultrasound stimulus, preferably complex structured spatial and temporal ultrasound patterns.

Thus, in one embodiment, the patterned ultrasound stimulus is the image of the visual information captured by the acquisition module (B).

In one embodiment, the ultrasound system of the present invention further includes means for visualizing and/or monitoring the activation of the neuronal cells in the stimulated area.

In one embodiment, the visualization and/or monitoring of the activation of the neuronal cells is based on electrode recordings.

Thus, in one embodiment, the ultrasound system of the present invention further comprises at least one electrode for recording the neuronal activity, in order to monitor the activation of the neuronal cells. In one embodiment, the at least one electrode is integrated in the support that is implanted in the subject's skull.

In one embodiment, the ultrasound system of the present invention comprises at least one multi-electrode array. In one embodiment, the at least one multi-electrode array comprises at least two electrodes. In one embodiment, the at least one multi-electrode array is comprised in the support that is implanted in the subject's skull.

In one embodiment, the ultrasound system of the present invention comprises at least one µEcoG electrode array. In one embodiment, the at least one µEcoG electrode array comprises at least two electrodes. In one embodiment, the at least one µEcoG electrode array is comprised in the support that is implanted in the subject's skull.

In one embodiment, the ultrasound system further comprises an imaging system able to image the neuronal activation by focused ultrasound in the brain region of interest.

In one embodiment, the visualization and/or monitoring of the activation of the neuronal cells is based on noninvasive vascular functional imaging.

In one embodiment, the ultrasound system of the present invention comprises means for visualizing the activation of the neuronal cells with functional ultrasound technology.

Thus, in one embodiment, the ultrasound system of the present invention further comprises a probe (or an ultrasound transducer) for evaluating the vascular functional response, in order to visualize and/or monitor the activation of the neuronal cells. In one embodiment, the probe is integrated in the support that is implanted in the subject's skull.

In one embodiment, the imaging probe (or ultrasound transducer) for evaluating the vascular functional response, in order to visualize and/or monitor the activation of the neuronal cells, is the same probe as the one used for the neuronal stimulation.

In one embodiment, the ultrasound system further comprises means to correct the ultrasonic activation pattern based on the functional imaging information. As an example, the amplitude or spatial extent of the CBV (Cerebral Blood Volume) changes in a region of interest and measured by functional imaging could be optimized by changing progressively the ultrasound activation pattern.

In one embodiment, the visualization and/or monitoring of the activation of the neuronal cells is based on calcium imaging with a fluorescent calcium sensor (or calcium indicator).

Thus, in one embodiment, the ultrasound system of the present invention further comprises means for visualizing the fluorescence emitted by the fluorescent calcium sensor. In one embodiment, the ultrasound system of the present invention further comprises a fluorescence imaging system.

The present invention thus further relates to a vector, preferably a viral vector, comprising a nucleic acid sequence encoding a mechanosensitive channel.

As used herein, the term "vector" refers to a genetic construct comprising expression control sequences operatively linked to a nucleic acid sequence to be expressed.

In one embodiment, said vector is a viral vector, such as, for example, an AAV vector, an adenovirus vector, a lentivirus vector, or a herpes simplex virus vector.

In one embodiment, the vector is an AAV. In one embodiment, the vector is an AAV selected from the group comprising or consisting of AAV1, AAV2, AAV5 and AAV9 serotypes. In one embodiment, the vector is an AAV, preferably an AAV serotype 9 (AAV9) or AAV serotype 2 (AAV2).

In one embodiment, the vector comprises the 7m8 mutation. Thus, in one embodiment, the vector is an AAV selected from the group comprising or consisting of AAV1-7m8, AAV2-7m8, AAV5-7m8 and AAV9-7m8 serotypes, more preferably the vector is an AAV9-7m8 or an AAV2-7m8.

In one embodiment, the vector comprises a nucleic acid sequence encoding MscL. In another embodiment, the vector comprises a nucleic acid sequence encoding MscL-G22s.

In one embodiment, the vector comprises a nucleic acid sequence encoding a reporter protein (optionally wherein said reporter protein is fused to the mechanosensitive channel), such as, for example, a cytoplasmic soluble protein. Examples of reporter proteins include, without limitation, tandem dimer Tomato (tdTomato), *Discosoma* sp. Red fluorescent protein (DsRed), green fluorescence protein (GFP), enhanced GFP (EGFP), enhanced yellow fluorescent protein (EYFP). In one embodiment, the vector comprises a nucleic acid sequence encoding tdTomato.

In one embodiment, the vector further comprises a nucleic acid sequence of a promoter. In one embodiment, the promoter is a cell-type specific promoter, preferably a neuron-specific promoter. Examples of promoters include, without limitation, the CAG (chicken beta-actin) promoter, the CAMKII (Ca2+/calmodulin-dependent protein kinase II) promoter, the SNCG (gamma-synuclein gone) promoter, the CMV (cytomemegalovirus) promoter, the synapsin I promoter and the EF-1a (eukaryotic translation elongation factor 1a) promoter.

In one embodiment, the vector comprises a promoter selected from the group comprising or consisting of the CamKII promoter, the CAG promoter and the SNCG promoter. In one embodiment, the vector comprises the CAMKII promoter.

In one embodiment, the vector further comprises an endoplasmic reticulum (ER) export signal, such as, for example, the Kir2.1 ER export signal.

In one embodiment, the vector of the present invention is an AAV9-7m8 vector comprising a nucleic acid sequence encoding the MscL-G22s channel fused to the red fluorescent protein tdTomato under the control of a CamKII promoter (and may be referred to as AAV9.7m8-CamKII-MscL-G22s-tdTomato).

The present invention further relates to a composition comprising a vector as described hereinabove.

The present invention further relates to a pharmaceutical composition comprising a vector as described hereinabove and at least one pharmaceutically acceptable excipient.

The term "pharmaceutically acceptable excipient" or "pharmaceutically acceptable carrier" refers to an excipient that does not produce an adverse, allergic or other untoward reaction when administered to an animal, preferably a human. It includes any and all solvents, dispersion media, coatings, antibacterial and antifungal agents, isotonic and absorption delaying agents and the like. For human administration, preparations should meet sterility, pyrogenicity, general safety and purity standards as required by regulatory offices, such as, for example, FDA Office or EMA.

The present invention further relates to a vector as described hereinabove for use as a medicament.

The present invention further relates to a vector comprising a nucleic acid sequence encoding a mechanosensitive channel as described hereinabove (e.g., an AAV9.7m8-CamKII-MscL-G22s-tdTomato) for inducing expression of a mechanosensitive channel in neuronal cells.

In one embodiment, the neuronal cells or extensions thereof are located in cortical areas including visual cortex, prefrontal cortex, sensory cortex, motor cortex, auditory cortex, Broca's area, Wernicke's area and association areas; or in subcortical areas including basal ganglia, thalamus, hypothalamus, brainstem, hippocampus, amygdala; or in the spinal cord, or the neuronal cells are located in the retina, in the cochlea or in the vestibule. In one embodiment, the neuronal cells are cortical neurons of the visual cortex, neurons of the lateral geniculate nucleus or retinal ganglion cells.

The present invention further relates to a vector comprising a nucleic acid sequence encoding a mechanosensitive channel as described hereinabove (e.g., an AAV9.7m8-CamKII-MscL-G22s-tdTomato) for use in the treatment or restoration of a sensory deficit, in particular of a visual deficit, in a subject in need thereof. In one embodiment, the subject is to be further exposed to or treated with an ultrasound stimulus ranging from about 4 MHz to about 20 MHz central frequency, as described hereinabove. In one embodiment, said vector is for transducing neuronal cells of the subject.

The present invention further relates to a vector comprising a nucleic acid sequence encoding a mechanosensitive channel as described hereinabove (e.g., an AAV9.7m8-CamKII-MscL-G22s-tdTomato) for use for inducing vision of an image in a subject. In one embodiment, the subject is to be further exposed to or treated with an ultrasound stimulus ranging from about 4 MHz to about 20 MHz central frequency, as described hereinabove.

EXAMPLES

The present invention is further illustrated by the following examples.

Materials and Methods

Animals

All experiments were conducted in accordance with the National Institutes of Health Guide for Care and Use of Laboratory Animals. The experimental protocol was approved by the Local Animal Ethics Committee and conducted in agreement with the Directive 2010/63/EU of the European Parliament. All rats included in this study were Long Evans rats from Janvier Laboratories.

Plasmid Cloning & AAV Production

Plasmids containing the *Escherichia coli* MscL sequence in the WT (wild type) form and with the G22S mutation correspond to Addgene plasmids #107454 and #107455 (these plasmids were a gift from Francesco Difato (Addgene plasmid #107454; http://n2t.net/addgene:107454; RRID: Addgene_107454; Addgene plasmid #107455; http://n2t.net/addgene:107455; RRID:Addgene_107455; Soloperto A et al., J Cell Sci. 2018 Jan. 29. pii: jcs.210393. doi: 10.1242/jcs.210393). To target retinal ganglion cells, the SNCG promoter was cloned into the AAV2-7m8 backbone plasmid containing the MscL sequence fused with tdTomato and the Kir2.1 ER export signal to drive expression to the plasma membrane. To target neurons in the cortical layers, the SNCG promoter was replaced by the CAG and CamKII promoters. All recombinant AAVs used were produced using the plasmid co-transfection method and the resulting lysates were purified to yield high-titer recombinant AAV virus.

US Stimulus

Figure 5:
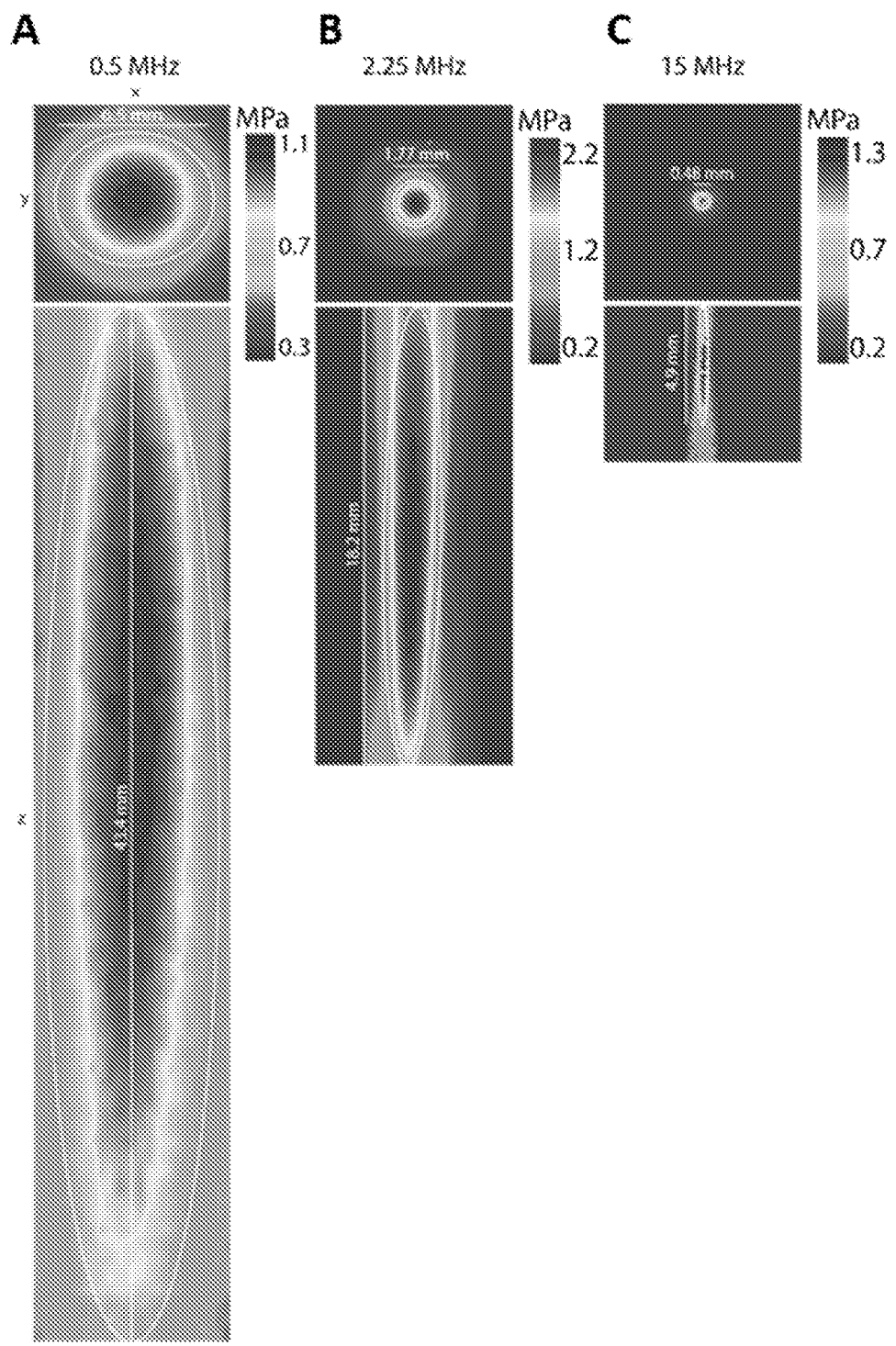
FIG. 5 is a combination of pressure maps showing the US pressure fields for 0.5, 2.25 and 15 MHz transducers. A-B-C: Grey coded pressure maps in the xy and xz plane for 0.5 (A), 2.25 (B) and 15 MHz (C). White lines delineate-3 dB pressure fields. Scale bars represent 2 mm.
Figure 6:
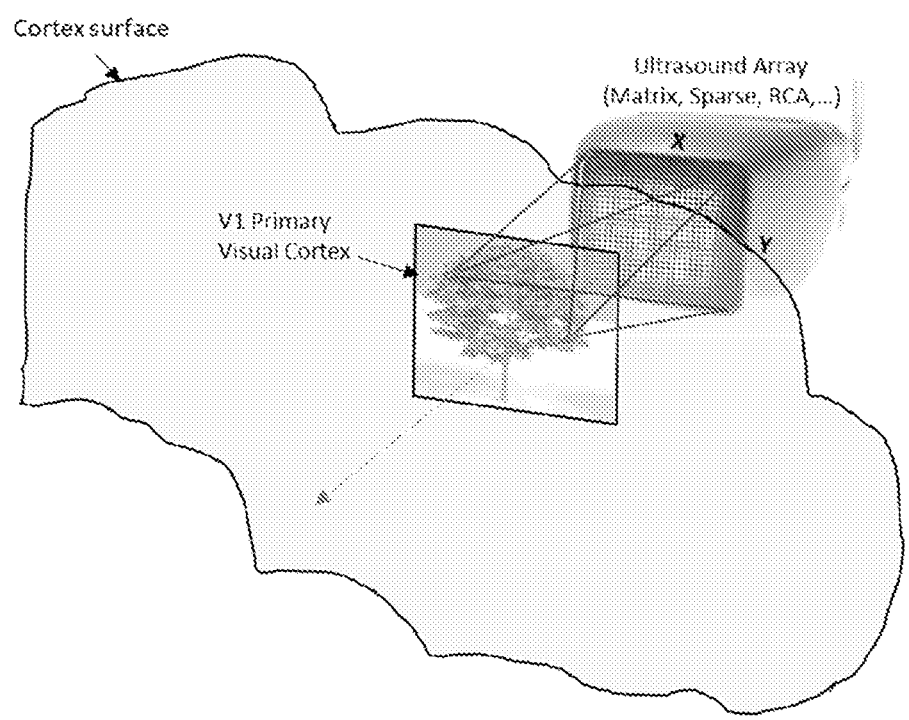
FIG. 6 is an illustration showing the principle of the method of the present invention applied for vision restoration. An ultrasound array, such as, for example, an ultrasound matrix, a sparse array or a RCA (Row Column array), emits unfocused ultrasound stimuli to stimulate neuronal cells in order to recreate an image in the visual cortex of a subject.
Figure 7:
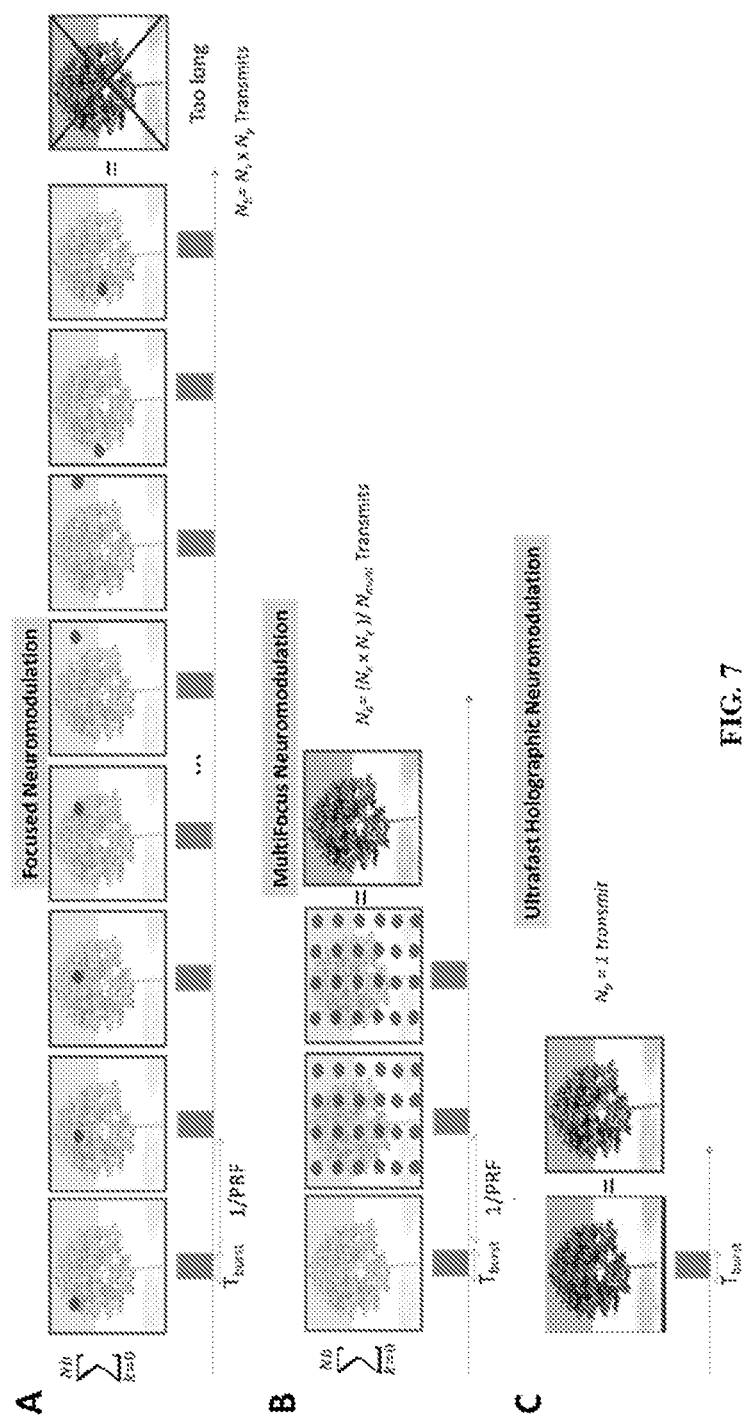
FIG. 7 is a combination of illustrations showing that an unfocused ultrasound stimulation is required to activate the neuronal cells in a reasonable time in order to restore the vision of an image in a subject. A: Schema of the principle of focused ultrasound stimulation. The ultrasound stimulus (i.e. a burst of ultrasound signal) is emitted sequentially in a unique focal point on the subject brain to reconstruct a full image. This protocol is too long to restore an image in the subject. B: Schema of the principle of multifocal ultrasound stimulation. The ultrasound stimulus is emitted simultaneously in several focal points until the reconstruction of a full image. This protocol is compatible with the restoration of an image in the subject. C: Schema of the principle of a stimulation with a complex structured spatial and temporal ultrasound pattern (i.e. ultrafast holographic stimulation). The ultrasound pattern, obtained from the coding of the visual information of an image, is emitted on the subject brain to reconstructed the image. This protocol is compatible with the restoration of an image in the subject.

Three transducers with three different central frequencies were used to have focal spots of different size: a 0.5 MHz transducer (V301-SU, Olympus), a 2.25 MHz transducer (V306-SU, Olympus) and a 15 MHz transducer (V319-SU, Olympus). A TiePie Handyscope (HS3, TiePie engineering) was used to produce the stimulus waveform and then passed through an 80 dB RF power amplifier (VBA 230-80, Vectawave) connected to the transducer. Acoustic field distributions of the US transducers were measured using a laser interferometer in a water bath. The estimated full width at half maximum (FWHM) focal spot diameter in the xy plane was of 6.50, 1.74 and 0.48 mm and the major axis in the xz plane was of 43.45, 18.22 and 4.9 mm for the 0.5, 2.25 and 15 MHz transducer respectively (FIG. 5). US stimuli used for ex vivo and in vivo stimulation had the following characteristics: 1 kHz Pulse repetition frequency (PRF) with 50% Duty Cycle (DC), sonication duration (SD) varied between 10 and 200 ms and inter-stimulus interval (ISI) between 0.01 and 2 s. Peak acoustic pressures varied between 0.11-0.88 MPa, 0.3-1.6 MPa, 0.2-1.4 MPa for the 0.5 MHz, 2.25 and 15 MHz transducers, respectively. The corresponding estimated Ispta values varied between 0.06-2.28 $W/cm^2$, 0.29-10.84 $W/cm^2$ and 1.13-26.88 $W/cm^2$.

Ex Vivo

Intra-Vitreal Gene Delivery and Retinal Imaging

Rats were anesthetized with isoflurane (5% for induction, 3% for maintain) and 2 µl of AAV solution containing $8-14\times10^{10}$ viral particles were injected in the centre of the vitreous cavity while directly observing the tip of the needle. One month after injection, fluorescent imaging of injected eyes was performed using the Micron IV retinal imaging microscope (Phoenix Research Labs) to observe MscL expression through the fluorescent tdTomato tag. Electrophysiological recordings were performed at least 1 month after injection.

MEA Recordings

Retinas were isolated under dim red light in Ames' medium (A1420, Sigma-Aldrich) bubbled with 95% O2 and 5% $CO_2$ at room temperature. Retina pieces were flattened on a filter membrane (Whatman, GE Healthcare Life Sciences) and placed on a poly-L-lysine (0.1%, Sigma) coated multi-electrode array (MEA) (electrode diameter 30 µm, spacing 200 µm, MEA256 200/30 iR-ITO, Multichannel systems, Germany) with retinal ganglion cells facing the electrodes. The retina was continuously perfused with bubbled Ames medium at 34° C. at a rate of 2 mL/min during experiments.

TdTomato fluorescence was checked prior to recordings using a stereo-microscope (SMZ25, Nikon, Germany) to observe transgene expression on the recorded area. For some experiments AMPA/kainate glutamate receptor antagonist, 6-cyano-7-nitroquinoxaline-2,3-dione (CNQX, 25 µM, Sigma-Aldrich), NMDA glutamate receptor antagonist, [3H] 3-(2-carboxypiperazin-4-yl) propyl-1-phosphonic acid (CPP, 10 µM, Sigma-Aldrich) and a selective group III metabotropic glutamate receptor agonist, L-(+)-2-Amino-4-phosphonobutyric acid (L-AP4, 50 µM, Tocris Bioscience, Bristol, UK) were freshly diluted and bath applied through the perfusion system 10 minutes prior to recordings.

Full-field light stimuli were delivered using a digital micro-mirror display (DMD, Vialux, resolution 1024×768) coupled with a white light LED light source (MNWHL4, Thorlabs, Inc.) focused on the photoreceptor plane. Light irradiance value was of 1 $\mu W/cm^2$. The US transducers were coupled with a custom-made coupling cone filled with degassed water, mounted on a motorized stage (PT3/M-Z8, Thorlabs) and placed orthogonally in the recording chamber above the retina.

To position the US transducer over the retina, the reflected signal of the MEA chip and the retina was detected using a US-key device (Lecoeur Eletronique). The distance between the retina and the transducer was equal to the focal length of the transducer and was verified using the flight time of the reflected signal.

RGC recordings were digitized using a 252-channel preamplifier (MultiChannel Systems, Germany). Spikes from individual neurons were sorted using SpykingCircus software. RGCs responses were then analyzed using custom scripts written in Matlab (MathWorks, Natick, MA, USA). They were classified according to their response to light flashes in ON, ON-OFF or OFF using the response dominance index. The latency of each cell to the stimulus onset or offset was computed as the maximum of the derivative of the spike density function. For cells responding to US stimulation two classes were identified according to their latency, short and long latency, by fixing a threshold equal to the minimum of the latency distribution of natural responses to US (45 ms). To calculate response duration, the peak value A of the spike density function was determined. The response duration is defined as the interval of time between the two time-points where the SDF is equal to A/e (e: euleur's number). The percentage of responsive cells to US stimulation of increasing US pressure was calculate as the ration between the number of activated cells and the maximum number of responding cells for all the considered US pressures. The fano factor, that quantifies spike-count variability, was calculated as the ratio of the variance of the spike-count to the mean. Values below 1 indicate an increase in information content. The Euclidian distance between two activated cells was weighted to the maximum firing rate of the cells. The ratio between the number of activated cells and the size of the stimulated area on the MEA chip was calculated considering the size of the US focal spot for 2.25 and 15 MHz and the size of the MEA for 0.5 MHz since the focal spot was larger than the MEA. The centre of response was estimated by weighing the maximum of the firing rate of each cell to the distance from other responding cells and the displacement of the response has been calculated as the Euclidian distance between two positions.

In Vivo

Intracranial Injections

Rats were anesthetized with a ketamine/medetomidine (40 mg/kg/0.14 mg/kg) mix. Surgical site was shaved and a midline incision was made to expose skull bone. After placing the animal in a stereotactic frame two burr hole were drilled at the injection sites. AAV solutions were injected into the right hemispheres at two different locations (coordinates from the bregma: 2.6 mm ML, 6.8 mm AP and 3.1 mm ML, 7.2 mm AP). For each location, 200 nl of the viral vector (containing $0.2-8\times10^{15}$ viral particles) were injected at 3 different depths (1100, 1350 and 1500 µm DV) using a micro-syringe pump controller (Micro4, World Precision Instruments, Inc.) with a rate of 50 nl/min and a 10 µl Hamilton syringe. Electrophysiological recordings were performed at least 1 month after injections.

In Vivo Extracellular Recordings

Rats were anaesthetized with a mix of ketamine/medetomidine (40 mg/kg/0.14 mg/kg). Pupils were dilated using tropicamide (Mydriaticum, Dispersa). A small craniotomy (5×5 mm square) was drilled above V1 in the right hemisphere. Prior to recording, tdTomato fluorescence was checked using the Micron IV retinal imaging microscope (Phoenix Research Labs).

A 32 sites Ecog electrode array (30 µm electrode diameter, 300 µm electrode spacing, FlexMEA36, MultiChannel Systems) was positioned over the transfected brain region for rats expressing MscL or in the same zone for control rats. After Ecog recordings, multi-electrode (MEA) recordings were performed using a 16 sites silicon microprobe (electrode diameter 30 µm, spacing 50 µm, A1×16-5 mm-50-703, NeuroNexus Technologies). The MEA probe was advanced 1100 µm vertically into the cortex using a 3-axis micromanipulator (Sutter Instruments, Novato, CA). The US transducer was coupled to the brain using a custom made coupling cone filled with degassed water and US gel and positioned over the region of interest using a motorized stage. The probe and the US transducer were perpendicular for µEcog recordings and tilted of 45° for intra-cortical recording. The distance between the target in the cortex and the transducer was equal to the focal length of the transducer and verified using the reflected signal with a US-key (Lecoeur Eletronique).

Visual stimuli were generated by a white light collimated LED (MNWHL4, Thorlabs, Inc.) placed 15 cm away from the eye. Light irradiance at the level of the cornea was of 4.5 $mW/cm^2$.

µEcog and extracellular signals were digitized using a 32-channel amplifier and a 16 channel amplifier respectively (model ME32/16-FAI-µPA-System, MultiChannel Systems). µEcog recordings were further analyzed using custom Matlab scripts. MEA recordings were further analyzed using SpykingCircus software and single channel events were analyzed using custom Matlab scripts. For µEcog recordings response duration was calculated as the interval of time between the two time-points where the cortical evoked potential was equal to A/e (where A is the peak depolarization and e: euleur's number). The peak depolarization of each channel linearly interpolated to build pseudo-color activation maps. The activated area was defined as the area of the pseudo-color activation map were the peak depolarization exceeded 30 µV. The centre of response was estimated by weighing the peak depolarization of each electrode to the distance from other electrodes. For intra-cortical recordings cell latency was estimated as the maximum of the derivative of the spike density function.

Surgery for In Vivo Behavioral Testing

Mice were anesthetized using a mixture of ketamine/xylazine (80 mg/kg/8 mg/kg) and were head-fixed on a sterotaxic-frame. A small craniotomy (approximately 3 mm×3 mm) was drilled above V1 in the right hemisphere. The cortex was covered using a TPX (transparent polyolefin resin, made from 4-polymethylpentene) plastic sheet and sealed using dental acrylic cement (Tetric Evoflow). For behavioral experiments, a metallic headbar (Phenosys) for head fixation was then glued to the skull on the left hemisphere using dental cement (FUJUCEM II). Behavioral training on mice was performed at least 10 days after the surgical procedure.

Mouse Behavioral Tests

C57BL6J mice were placed on a water restriction schedule and received daily ~0.5-1 mL of water per day until they reached approximately 80-85% of their ad libitum weight. Mice were progressively habituated to drink from a syringe, to be head-fixed and enclosed within a cylindrical body tube for the first 5 days. Mice were then trained to respond to a light stimulus by performing a voluntary detection task by licking a waterspout (blunt 18G needle, approximately 5 mm from mouth) in response to white light full-field stimulation (200 and 50 ms long) of the left eye (dilated using tropicamide, Mydriaticum *Dispersa*). Water (~4 µL) was automatically dispensed 500 ms after light onset, through a calibrated water system. The behavioral protocol and lick detection were controlled by a custom made system. Visible light training lasted 4 days for light stimulation, a typical training session lasted approximately 30 minutes during which mice performed 75-100 trials. After light stimulation training, 4 days (the first and second days were interleaved by a two days break during week-ends) of US stimulation of V1 in the right hemisphere were performed. Those 4 days were interleaved US stimulation 50 ms long US stimulation at three different pressure values (0.2, 0.7 and 1.2 MPa) were interleaved but changing the stimulus order daily. Inter-trial intervals for light and US stimulation varied randomly and ranged between 10 and 30 s. The 15 MHz US transducer was coupled to the brain with a custom-made coupling cone filled with water and US gel, and was positioned over the region of interest with a motorized stage. To assess the impact of the light and US stimulation on mice behavior, the success rate was assessed by counting the number of trials when mice performed anticipatory licks, i.e. licks that happened between the stimulus onset and the water valve opening. The anticipatory lick rate was calculated by subtracting it to the spontaneous lick rate (calculated in a 1 s time window before stimulus onset) and multiplied by the success rate. Lick latency was calculated by determining the latency of the first anticipatory lick after the stimulus onset.

Immunohistochemistry and Confocal Imaging

Transduced retinas and brains were fixed in 4% paraformaldehyde (100496, Sigma-Aldrich) for 30 min for retinas and overnight for brains. Brains were cryoprotected in 30% sucrose (84097, Sigma-Aldrich) and 50 µm thick sagittal slices were cut using a microtome (HM450, Microm). The most tdTomato fluorescent slices for each brain were selected for further immunohistochemistry and imaging. Retinas and sagittal brain cryosections were permeabilized in phosphate buffer saline (PBS) with 0.5% Triton X-100 for 1 hour at room temperature and then incubated in blocking buffer (PBS+1% BSA+0.1% Tween 20) for 1 hr at room temperature. Samples were incubated overnight at 4° C. with a monoclonal anti-RBPMS (RNA-binding protein with multiple splicing protein) antibody (1:500, Rabbit, ABN1362, Merck Millipore) for the retina and with monoclonal anti-NeuN antibody (1:500, Mouse, MAB377, Merck Millipore) for brain sections, in half diluted blocking buffer+0.5% Triton X-10. Secondary antibodies conjugated with Alexa Fluor (1:500; Molecular Probes) and DAPI (4',6-diamidino-2-phenylindole) (1:1000, D9542, Merck Millipore), were applied for 1 hour at room temperature. An Olympus FV1000 laser-scanning confocal microscope with 20× objective (UPLSAPO 20XO, NA: 0.85) was used to acquire images of flat mounted retinas and brain sections.

Transduction Efficiency Calculation

Confocal images were processed with FIJI software (ImageJ) to assess transduction efficiency. RBPMS and NeuN positive cells were counted automatically using the Analyze particles FIJI plugin. MscL-tdTomato and MscL-tdTomato-RBPMS/NeuN positive cells were counted manually by two different users using CellCounter FIJI plugin. For retina, quantifications were performed identifying the transfected area in each retina and acquiring confocal stacks in eight randomly chosen regions of 0.4 mm².

For V1 neurons, the sagittal brain slice with the largest MscL expressing zone was selected for each animal. In some slices, tdTomato diffused also outside V1 therefore a ROI in V1 was manually defined and quantifications were performed in eight randomly chosen regions of 0.4 mm².

US-Induced Tissue-Heating Simulations

When considering cell stimulation at higher US frequencies (15 MHz) than usually described in the US neuromodulation literature, it is mandatory to estimate thermal effects as they can become important. This estimation was done through a three-fold process: 1) simulation of the acoustic fields generated by the 3 transducers we used in the study with realistic acoustic parameters, 2) determination that non-linear acoustics did not play an important role in the heat transfer and 3) realistic simulations of the heat transfer and temperature rise induced at focus by US in a linear regime for the parameters used in this study.

For non-linear simulations, Matlab's toolbox kWave was used, by defining the geometry of the transducer in 3D, and using the following parameters for the propagation medium (water): sound speed c=1500 m s$^{-1}$, volumetric mass ρ=1000 kg m$^{-3}$, non-linearity coefficient B/A=5, attenuation coefficient α=2.2 10$^{-3}$ dB cm$^{-1}$ MHz$^{-y}$, and frequency power law of the attenuation coefficient y=2. Quasi monochromatic 3D wave-fields were simulated using long bursts of 50 cycles, this gave both the maximum pressure field in 3D and the waveform at the focus. Simulations were calibrated by adjusting the input pressure (excitation of the simulated transducer) in order to reach the pressure at focus measured in the water tank with the real transducers. The FWHM focal spot diameter in the xy plane was 4.36, 1.61 and 0.276 mm, and the major axis in the xz plane was 32.3, 20.6 and 3.75 mm long for the 0.5, 2.25 and 15 MHz transducers, respectively. Non-linear effects were evaluated by estimating the relative harmonic content of the waveform at focus. In the 15 MHz focus transducer example, the experimental and simulated signals at focal spot were compared and found in very good agreement (FIG. 11A). Furthermore, the amplitude of the second harmonic is 19.8 dB below the fundamental (20.9 dB in the simulated case), meaning that if the fundamental energy is E, the second harmonic has energy E/95 (FIG. 11B). Therefore, the non-linear effects can reasonably be neglected in the calculations of the thermal effects as it accounts for ~1% of the involved energy. Conclusions were the same at 0.5 MHz and 15 MHz. Using linear wave propagation approximations considerably lighten the computing cost of the simulations. Linear propagation simulations were conducted using the Field II toolbox in Matlab in monochromatic mode with the same medium properties than using kWave (water), to obtain the 3D maximum pressure fields. These maximum pressure fields where used to build a heating source term $$Q_{US} = \frac{\alpha_{np} p_{max}^2}{\rho_b c_b},$$

with $\alpha_{np}$ being the absorption coefficient of the brain at the considered frequency (59.04 Np m$^{-1}$ at 15 MHz, calculated from $\alpha_{brain}$=0.21 dB cm$^{-1}$ MHz$^{-y}$ and y=1.18), the brain volumetric mass $\rho_{brain}$=1046 kg m$^{-3}$, the brain sound speed $c_{brain}$=1546 m s$^{-1}$, and $p_{max}$ being the 3D maximum pressure field. This source term was then used in the resolution of a Penne's bioheat equation $$\rho_{brain} C_{brain} \cdot \frac{\partial T}{\partial t} = div(K_t \cdot \nabla T) - \rho_{blood} C_{blood} P_{blood}(T - T_a) + Q$$

in kWave, where $C_{brain}$ is the blood specific heat capacity (3630 J·kg$^{-1}$° C.$^{-1}$), $K_t$ the brain thermal conductivity (0.51 W·m$^{-1}$° C.$^{-1}$), the blood density 1050 kg m$^{-3}$, $C_{blood}$ the blood specific heat capacity (3617 J·kg$^{-1}$° C.$^{-1}$), $P_{blood}$ the blood perfusion coefficient (9.7 10$^{-3}$ s$^{-1}$), $T_a$ the arterial temperature (37° C.), and Q=$Q_{US}$+$\rho_{brain}$·$\gamma_{brain}$ with $\gamma_{brain}$ the heat generation of the brain tissue (11.37 W kg$^{-1}$)[61,62]. The initial condition for the brain temperature was set to $T_0$=37° C.

This simulation corresponds to the worst-case scenario regarding the temperature rise given: 1) that the acoustic propagation is simulated in water only, with a lower attenuation coefficient (2.2 10$^{-3}$ dB cm MHz$^{-2}$) than the brain (0.59 dB cm MHz$^{-1.27}$), even if a part of the propagation occurs within the brain. Therefore $p_{max}$ maps are overestimated. 2) thermal absorption is simulated in brain tissue only, with a high absorption coefficient (0.21 dB cm MHz-1-18) compared to water, even if a part of the maximum pressure field is actually located within the water of the acoustic coupling cone. Therefore $Q_{US}$ is again slightly overestimated. The temperature was mapped in 3D and in time and looked for the point of maximal temperature rise (FIG. 11C-F).

Data Analysis

Statistical analysis was carried out using Prism software (Prism 7, GraphPad software, Version 7.0). All values are expressed as mean±standard error mean. The performed statistical tests are detailed in figure legends.

Results

Example 1: Characterization of Three Focused Ultrasonic Transducers

In order to investigate a suitable approach for a proof of concept of sonogenetic brain activation, three focused ultrasonic transducers were first characterized. Their dimensions and geometrical focus were chosen both to provide a relevant model of future implanted matrix arrays in human applications and to be suited for the proof of concept experiments in rodents (FIG. 10A-B). Transducer were designed with similar focal distance (F=31.7 mm for the lower frequency and F=25.4 mm for the 2 higher frequencies) transmitting focused beams in different frequency ranges (respectively f=0.5 MHz, f=2.25 MHz and f=15 MHz corresponding to 3.0, 0.7 and 0.1 mm wavelength) (FIG. 10C-E). Increasing the frequency of the ultrasound stimulation from 0.5 MHz (typical of neuromodulation) (FIG. 10C) to 15 MHz (FIG. 10E) dramatically changes the achievable resolution: dividing the wavelength by 30 approximately, reducing the size of the focal spot and therefore of the stimulated volume by a factor of 27 000. Most of the experiments were therefore conducted at 15 MHz, the two lower frequency were first used for comparison in terms of efficiency and spatial resolution.

Example 2: Stimulation of Retinal Ganglion Cells Ex Vivo

To investigate sonogenetic therapy in a mammalian neuronal circuit, the mechano-sensitive ion channel of large conductance (MscL) was expressed in rat retinal ganglion cells (RGCs) using adeno-associated vector (AAV) delivery in vivo to the eye vitreous. Vectors were produced with the MscL gene from *Escherichia coli* in its original form (WT) and with an amino acid substitution, G22s, which increased the sensitivity to mechanical stimulation for cultured neurons. The sonogenetic vector, an adeno-associated viral vector, serotype AAV2.7m8, was encoding these MscL channels fused to the red fluorescent protein tdTomato under the SNCG specific RGC promoter. Following intravitreal injection of both AAV vectors, expression of td-Tomato was detected in vivo on the eye fundus. Examination of the flat-mounted retina showed tdTomato expression restricted to the ganglion cell layer and the optic fiber bundles. To further demonstrate that expression was limited to RGC, these cells were labelled with an RPBMS antibody. The staining indicated that, in the transfected area, 33.73% and 45.83% of RPBMS-positive cells were expressing tdTomato for the MscL-WT and MscL-G22s proteins, respectively (FIG. 1A). The expression of the MscL gene appeared concentrated at the cell membrane on the soma and axon.

To measure RGC sensitivity to ultrasound, the retina was recorded ex vivo on a multi-electrode array. For retinas expressing the MscL channel, many RGCs showed strong and sustained ON responses with a very short latency (SL) (12.2±2.5 ms) (FIG. 1B). Production of these SL ON US (ultrasound) responses were not related to a specific RGC cell type (FIG. 4A) as they were measured in cells generating either ON and/or OFF responses to light. Expression of MscL shortened the latency but also increased the number of US responding cells (FIG. 1C). In addition, it enhanced significantly the RGC sensitivity to lower US pressure values (FIG. 1D).

The US responses were also compared when stimulating with different US frequencies. The response features were similar for both 0.5 and 2.25 MHz US stimulation (FIG. 4A-E). Additionally, it was observed that the G22s mutation enhanced further the US sensitivity of RGCs to lower US pressure (FIG. 1E).

The temporal kinetics of US responses were investigated under different US stimulation durations and at various repetition rates. Neurons were responding even to very short stimulation durations (10 ms) with responses persisting after the stimulus offset (FIG. 2A). For longer stimuli, 100 ms and over, responses became transient, this form of habituation reduced the maximum firing rate without cancelling the response (FIG. 2C). US response duration was correlated to the stimulus duration (FIG. 2D). Using different repetition rate of a 15 MHz US stimulus (stimulus duration equal to 10% of the inter-stimulus interval), RGCs were able to follow the rhythm up to 10 Hz (FIG. 2B-2E). The fano factor in the previous experiments demonstrated the high reproducibility and high content of the responses (FIG. 2C-2E).

Then, it was investigated whether different US frequencies (0.5, 2.25 and 15 MHz) could affect the spatial resolution in agreement with the measured US pressure fields that become smaller at higher US frequencies (FIG. 5A-C). US responding cells are widely distributed all over the recorded retina with 0.5 and 2.5 MHz, whereas they appear more confined within a spot at 15 MHz. Then, for each stimulated retina, the weighted mean distance between US responding cells was calculated at different US frequencies. The corresponding averaged value decreased from 1.48±0.12 mm (n=12 retina) and 1.30±0.18 mm (n=5 retina) at 0.5 MHz and 2.25 MHz, respectively, to 0.59±0.03 mm (n=9 retina) at 15 MHz (FIG. 2F) (the mean distance between two random selected electrodes on the MEA chip being of 1.73 mm). The number of activated cells scaled to the size of the stimulated area on the MEA chip increased significantly when increasing the US frequency (FIG. 2G), suggesting that the higher frequency US stimulus is more effective. Indeed, the acoustic intensities per unit area at 2.25 and 15 MHz were quite similar (respectively Isptp=40.3 W/cm$^2$ and Isptp=56.3 W/cm$^2$) and consequently the delivered acoustic power was lower at 15 MHz than 2.25 MHz. The mean distance between activated cells was well in agreement with the size of the measured ultrasound pressure field (FIG. 5A-C). Interestingly, with the 15 MHz, the recorded area was large enough so that the stimulation probe could be moved above the retina, triggering thereby a shift in the responding cells. This shift of responding cells was following the same direction and pace as the movement of the probe onto the retina. The center of response was estimated by weighing the maximum of the firing rate of each cell to the distance from other responding cells. The center of response was found to move accordingly to the displacement of the US transducer (FIG. 2H). These results demonstrated that the sonogenetic therapy presented here can provide a spatial resolution compatible with patterned stimulations required for vision restoration.

Example 3: Stimulation of Cortical Neurons in Visual Cortex In Vivo

Once established ex vivo that 15 MHz stimulation can reliably activate RGCs with high temporal and spatial resolution, it was investigated whether this sonogenetic therapy could also apply to the in vivo brain. An AAV vector serotype AAV9-7m8 encoding the MscL-G22s channel fused to the red fluorescent protein tdTomato under the CamKII (AAV9.7m8-CamKII-MscL-G22s-tdTomato) was injected in rat V1 visual cortex. TdTomato fluorescence was detected already at the brain level and in cortical slices. Cortical V1 cells were expressing tdTomato especially in layer 4.33.4±14.4% (n=3 rats) of cortical neurons, detected with a NeuN antibody, were expressing tdTomato in the transfected area for CamKII promoter.

To explore the ability of a short 15 MHz stimulus to activate V1 neurons, a µEcoG electrode array was placed on the transfected area on V1 (FIG. 3A). In the absence of AAV injection, no US-evoked signal was recorded (FIG. 3B), whereas, in V1 expressing MscL-G22s-tdT, US stimulations of the cortical surface produced large negative µEcoG potentials (FIG. 3B). The sonogenetic responses presented a negative deflection (FIG. 3B), as observed for the visual-evoked potentials. These US responses were consistent with MscL activation because they persisted several milliseconds after US stimulus offset (FIG. 3B), as observed above in the retina. The US response duration was clearly related to the US stimulation duration (FIG. 3C). The amplitude of US-evoked potentials was increasing with increasing US pressure values (FIG. 3D) and also related to the US stimulation duration (FIG. 3E). As in the retina, V1 was also able to follow a repetition rate up to 8 Hz (FIG. 3F).

The spatial distribution of US-evoked neural activity was next investigated. The peak depolarization of each channel was measured and linearly interpolated to build grey coded activation maps (FIG. 3G). The size of the US-responding cortical area was dependent on the US-applied pressure varying from 0.58±0.17 mm$^2$ (n=6 rats) up to 1.41±0.23 mm$^2$ (n=5 rats) for 0.26 and 1.27 MPa respectively (FIG. 3I). To investigate the possibility to achieve patterned US stimulations, the US transducer was moved with 0.4 mm step on the recorded area. When the ultrasound probe was moved laterally, the source of the generated neuronal activity moved in a similar direction (FIG. 3H). The spatial location of the evoked potentials moved significantly of 0.29±0.09 mm (n=6 rats) from the previous location (FIG. 3J). These measurements are probably conditioned by the 300 µm discrete spatial pitch distribution of the µEcoG electrodes and the lateral spread of activity in the circuit. These results are consistent with the conclusion that this approach of sonogenetic therapy can afford at least a 400 µm spatial resolution with a 15 MHz stimulation, the focal spot at this frequency being 276 µm. It opens the possibility to target very small areas (down to 0.58 mm$^2$ for 0.26 MPa) depending on the pressure level. These very localized US-evoked responses and their dependence to the US probe position confirmed that they were due to the local activation of MscL-G22s-expressing V1 neurons.

Then, it was investigated if a 15 MHz US stimulus was able to activate neurons at different V1 depths. V1 neurons were recorded with a 16 site penetrating multi-electrode array. In V1 expressing MscL-G22s-tdT, 15 MHz US stimulation generated again SL sustained responses even to 10 ms long US stimuli (FIG. 3K). The latency of these responses was short (5.10±0.62 ms (n=27 cells and 7.51±1.00 ms n=58 cells, for 10 ms and 50 ms stimuli respectively, FIG. 3M), consistent with a direct US activation of recorded cortical neurons. Responding neurons were recorded at various cortical depths, ranging from 100 µm to 1 mm (FIG. 3N) being the focal spot diameter of the US probe of 3.75 mm in the xz plane. Deep neurons responded reliably to stimuli of decreasing duration, from 50 ms to 10 ms with similar firing rates to different stimulus duration whereas longer stimulation were able to induce a respond in a wider population of neurons (FIG. 3L)

Therefore, this sonogenetic therapy provides a unique combination of fast response time, high spatial resolution and high cell selectivity and sensitivity required for video-rate wide brain pattern stimulations.

Example 4: Sonogenetic Stimulation Induce Light Perception in Mice

Figure 9:
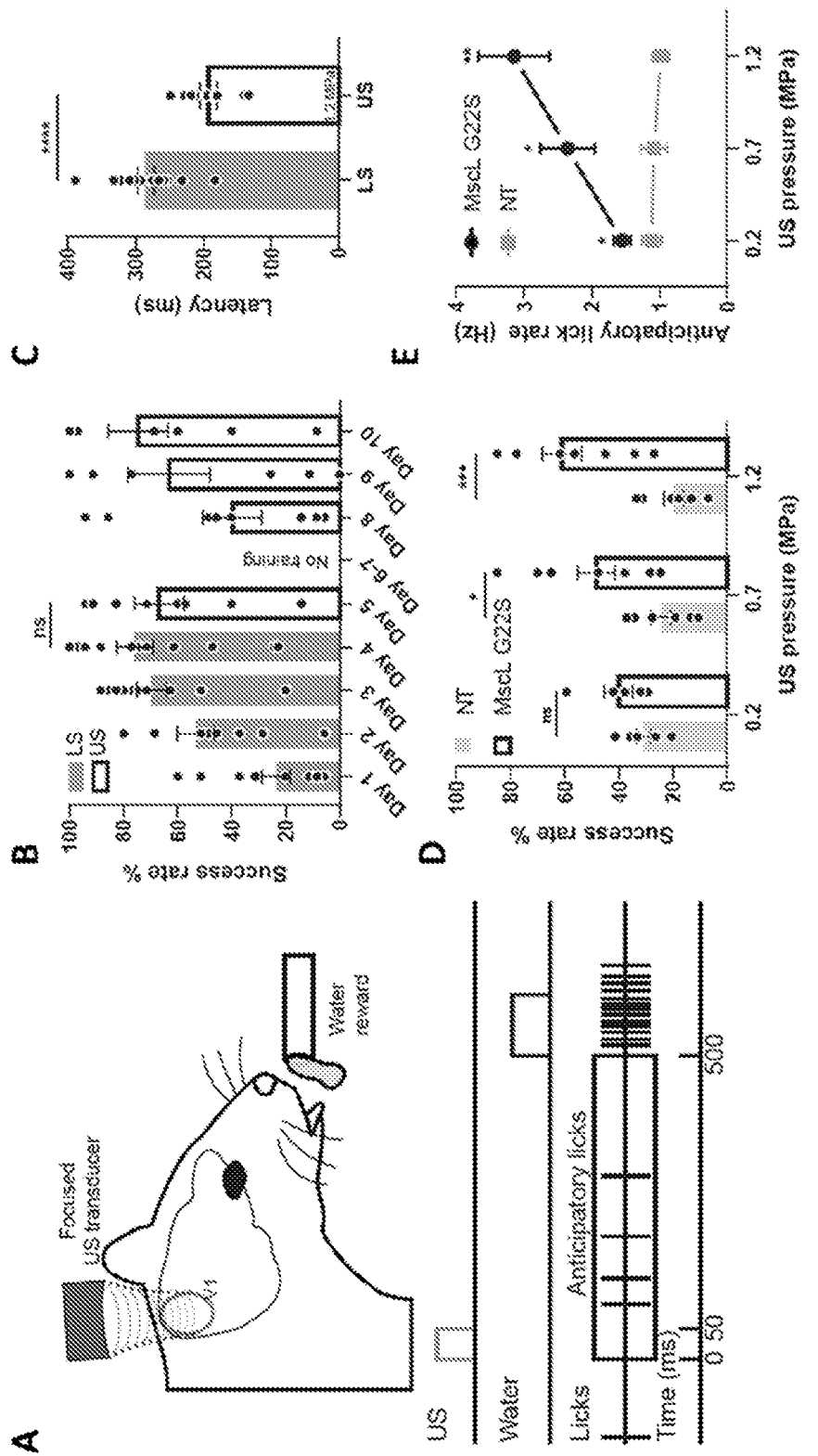
FIG. 9 is a combination of graphs, histograms and a schema showing the behavioral response induced by a sonogenetic activation of V1 cortex in mice following an associative visual training. A: Schematic diagram of the behavioural task performed by mice. Water-restricted animals trained in an associative learning paradigm for light stimulation with a water reward are stimulated with a 15 MHz US stimulation of V1. A trial is considered successful when the animal performed at least one anticipatory lick within the 500 ms time window prior to the water reward. B: Mean rates of successful trials of 4 days of training during the associative learning between light stimulation (50 ms) and the water reward (LS dark grey) followed by the US stimulation (US light grey) (50 ms 1.2 MPa, ns, p=0.4311, unpaired t test). C: First anticipatory lick latency following light (50 ms) and US stimulation (50 ms, 1.2 MPa) (***, p<0.0001, unpaired t test). D: Mean rate of successful trials over 4 days of US stimulation for non-transfected (NT) and MscL-G22S transfected mice following 50 ms US stimulation of increasing US pressure (ns, p=0.0751, *, p=0.0114, ***, p=0.0006, unpaired t test, for 0.2, 0.7 and 1.2 MPa respectively). E: Anticipatory lick rates for NT and MscL-G22S transfected mice at increasing US pressures (*, p=0.0424, *, p=0.0150, p=0.0031, unpaired t test, for 0.2, 0.7 and 1.2 MPa, respectively).

To determine whether sonogenetic stimulation could also induce light perception, mouse behavior was assessed following 15 MHz US stimulation of V1 in MscL G22S transfected (n=9) and non-transfected animals (n=7). Water-restricted mice were trained to associate a visible light stimulation of one eye with water reward (FIG. 9A), this task was learned within 4 days as indicated by the increasing success rate during this period that changed from 23.57% to 76.09% (FIG. 9B). The success rate was measured by the occurrence of an anticipatory lick happening between the light stimulus on-set and the water reward released 500 ms later (FIG. 9A).

Following this associative learning phase, mice were then subjected to US stimulation of V1 at day 5 (FIG. 9B). Upon US stimulation at highest pressure, MscL-G22S transfected mice achieved a success rate (66.98%) similar to the one of light stimulation at day 4 (FIG. 9B), the difference was not statistically significant. Then, after a pause over the week-end (day 6-7), the animals had partially forgotten the task associating the sonogenetic stimulation to the water reward (FIG. 9B). However, they immediately recovered their efficient association at day 10 (FIG. 9B). When considering these results, it was observed that the latency of the first anticipatory lick was shorter for the sonogenetic stimulation (193.2±12.8 ms n=9) than that elicited by the light flash (285.3±12.4 ms n=15) (FIG. 9C). This shorter latency for the US response is in complete agreement to the shorter neuronal activation of cortical neurons for the sonogenetic stimulation than that to the light stimulation of the eye. It could thus be explained by the reduction of the delayed transfer of visual information from the eye to V1. Non-transfected animals were not able to associate the US-stimulation of their cortex to the water reward (FIG. 9D), demonstrating thereby that the sonogenetic activation of cortical neurons was truly the triggering factor. When different US pressures were applied on the visual cortex in transfected mice, the success rate was increasing with the pressure (FIG. 9D). Interestingly, the licking frequency during the 500 ms prior to the water reward was also increasing with the US pressure (FIG. 9E). These results indicate that the sonogenetic stimulation of the visual cortex generates light perception in mice.

Example 5: Simulations of US-Induced Heating in Brain Tissue

Simulations of US-induced heating in brain tissue revealed that typical US parameters (i.e. 20 ms 1.27 MPa) (FIG. 3B-E), were estimated to increase the local temperature by 0.12° C. (see methods) and even their high repetition rates (up to 13 Hz) lead to moderate temperature increase (<0.3° C.) (FIG. 11C-F). These low temperature fluctuations and stimulation sequences that are compliant with FDA limits, tend to prove that this approach did not cause any toxic side effect and that US-elicited responses were not temperature-driven and very likely mediated by the mechanical activation of the MscL channel by US.

The invention claimed is:

1. A method for reversibly stimulating neuronal cells in a subject, wherein said method comprises:
   (i) transducing neuronal cells with a vector comprising a nucleic acid sequence encoding a mechanosensitive channel, thereby inducing expression of exogenous mechanosensitive channels by the neuronal cells and,
   (ii) exposing the neuronal cells expressing exogenous mechanosensitive channels to at least one ultrasound stimulus of about 15 MHz central frequency, wherein the at least one ultrasound stimulus has a sonication duration comprised between about 5 and about 50 ms, and wherein said ultrasound stimulus is repeated with an inter-stimulus interval (ISI) between about 0.01 and about 2 s.

2. The method according to claim 1, wherein the at least one ultrasound stimulus has a peak acoustic pressure comprised between about 0.01 and about 2 MPa.

3. The method according to claim 1, wherein the at least one ultrasound stimulus is a burst of ultrasound signals or a multi-frequential ultrasound stimulus.

4. The method according to claim 1, wherein the at least one ultrasound stimulus is unfocused.

5. The method according to claim 4, wherein the at least one ultrasound stimulus is simultaneously focused at multiple locations, wherein the at least one ultrasound stimulus is composed of several ultrasonic beams successively focused at different locations within the whole duration of the ultrasound stimulus or wherein the at least one ultrasound stimulus is a complex structured spatial and temporal ultrasound pattern.

* * * * *